United States Patent [19]

Hasegawa

[11] Patent Number: 5,336,874
[45] Date of Patent: Aug. 9, 1994

[54] BAR CODE READER WITH ERROR DETECTION AND DECODE CONTROL

[75] Inventor: Kazuo Hasegawa, Furukawa, Japan

[73] Assignee: Alps Electric Co., Ltd., Tokyo, Japan

[21] Appl. No.: 839,463

[22] Filed: Feb. 20, 1992

[30] Foreign Application Priority Data

| Feb. 22, 1991 | [JP] | Japan | 3-048681 |
| Feb. 25, 1991 | [JP] | Japan | 3-050089 |
| Feb. 25, 1991 | [JP] | Japan | 3-050277 |
| Feb. 25, 1991 | [JP] | Japan | 3-050278 |
| Feb. 25, 1991 | [JP] | Japan | 3-050279 |

[51] Int. Cl.⁵ .............................................. G06K 7/10
[52] U.S. Cl. ..................................... 235/466; 235/462
[58] Field of Search ............... 235/470, 462, 472, 437, 235/436, 466, 463

[56] References Cited

U.S. PATENT DOCUMENTS

| 4,538,060 | 8/1985 | Sakai et al. | |
| 4,855,581 | 8/1989 | Mertel et al. | 235/462 |
| 4,859,840 | 8/1989 | Hasegawa et al. | 235/463 |

Primary Examiner—Davis L. Willis
Assistant Examiner—Edward H. Sikorski
Attorney, Agent, or Firm—Guy W. Shoup; Patrick T. Bever

[57] ABSTRACT

A bar code reader includes a line sensor having a scanning range large enough to scan two or more bar codes. A portion of the scanning range having a size corresponding to a single bar code is determined as a reading range. A reading range comparator 35 determines when a bar code is positioned within the reading range, so that no other bar code within the scanning range will be read. The reader also has error detection to determine whether counted numbers of bars fall within a permissible range for a given bar code symbology.

1 Claim, 11 Drawing Sheets

BAR CODE READER WITH ERROR DETECTION AND DECODE CONTROL

BACKGROUND OF THE INVENTION

1. Field to the Invention

This invention relates to an optical reading apparatus for reading a bar code printed on a print medium such as paper, and more particularly to an optical reading apparatus of the type having a function of detecting an error in reading of a bar code.

2. Description of the Prior Art

A bar code is composed of a plurality of bars having different widths and different spaces so as to code characters such as letters and numerals in order to represent a train of characters of a price, a name and so forth of a commodity in an array of bars. A code representing a character will be hereinafter referred to as character code. While the number of bars representing a character code and/or combination patterns of thick and thin bars are different among different bar code systems, any of the bar code systems includes, at the front and rear of a train of bars representative of all character codes, a pair of margins (blank portions) and start and stop codes, respectively.

In the following description, the interleaved 2-of-5 system is employed as the bar code system for convenience of description. According to the interleaved 2-of-5 system, one character is represented by five black bars, and also five white bars provided by spaces between black bars represent one character. While a bar code represents a plurality of character codes, it also represents a plurality of places of character codes with each character code forming a place.

In a bar code representation of the type mentioned, a start margin of a predetermined width is provided by a ground color portion of a print medium on the left side of the bar code representation while a stop margin of the predetermined width is provided by another ground color portion of the print medium on the right side of the bar code representation, and the margins are used in order to judge that such bar code representation is provided. A thin bar at the left end of the bar code representation and another thin bar next to the left end thin bar represent a start code while a thin bar at the right end of the bar code representation and a thick bar leftwardly next to the right end thin bar represent a stop code. Between the start and stop codes, character codes are represented in combinations of predetermined numbers of thin and/or thick bars (black bars) and thin and/or thick spaces (white bars). Here, if a direction in which the character codes are arrayed (that is, in the direction from the start code to the stop code) is determined as a forward direction, then the bar code is normally read in the forward direction. However, the bar code is likely read in the reverse direction. In such instance, the start code is read as if it were a stop code, and the stop code is read as if it were a start code. Accordingly, the start and stop codes are read different in pattern depending upon the reading direction, which makes it possible to discriminate the reading direction of the bar code.

An optical reading apparatus for reading such bar code is often called bar code scanner. An exemplary one of conventional bar code scanners which employ a line sensor is shown in FIGS. 10 and 11. Referring to FIGS. 10 and 11, the conventional bar code scanner shown includes a reading signal latch circuit 1, and a light irradiating section 2 for irradiating light upon a print medium 5 on which a bar code 6 is printed. The bar code scanner further includes an optical image forming section 3, a scanning counter 4, a start pulse generating circuit 7, a pulse width setting circuit 8, a level detecting circuit 9, a photoelectric transducer section 10 in the form of a line sensor, a pair of frequency dividing circuits 11 and 12, an oscillating circuit 13, a binary digitizing circuit 14, a scanning number constant memory 15, a scanning number counter 16, a scanning number comparator 17, an edge detecting circuit 18, a timer counter 19, a count value memory 20, a count value memory controlling section 21, a bit image converting section 22, a character code image memory 23, a stop code image memory 24, a bit image memory controlling section 25, a start/stop judging section 26, a character converting section 27, a character code coincidence comparator 28, an error processing circuit 29, a constant memory 30, a data coincidence number counter 31, a data coincidence number comparator 32, and an output data converting section 33. The count value memory controlling section 21 includes a margin judging section 211, a fast/slow judging section 212, an address counter 213, an address decoder 214 and a reset circuit 215. The bit image memory controlling section 25 includes a bit image memory address counter 251 including a bit counter 2511 and a character counter 2512, and a bit image memory address decoder 252.

In operation, referring to FIG. 10, the oscillating circuit 13 is operating normally, and an output signal of the oscillating circuit 13 is frequency divided by the frequency dividing circuit 11 to form a clock signal $\phi1$ and also frequency divided by the other frequency dividing circuit 12 to form another clock signal $\phi2$. The clock signal $\phi1$ is supplied to the photoelectric transducer section 10 and the scanning counter 4 while the clock signal $\phi2$ is supplied to the timer counter 19.

When a reading start signal S is supplied to the bar code scanner from a host equipment not shown, the reading signal latch circuit 1 is set and outputs a reading signal READ to the light irradiating section 2 and the start pulse generating circuit 7. The light irradiating section 2 has an LED (light emitting diode) as a light emitting element and energizes, in response to the reading signal READ, the LED so that light may be emitted from and irradiated upon a printed area of the bar code 6 on the print medium 5. Light reflected from the printed area is irradiated upon a light receiving face of the line sensor constituting the photoelectric transducer section 10 by way of the optical image forming section 3 so that an image of the bar code 6 is formed on the light receiving face of the line sensor by the optical image forming section 3. The following description will proceed on the assumption that the photoelectric transducer section 10 is constituted from a line sensor.

The start pulse generating circuit 7 generates a start pulse ST when all of the following four conditions are satisfied:

(1) A scanning end signal SED is being received from the scanning counter 4.

(2) A reading signal READ is being received from the reading signal latch circuit 1.

(3) Setting of a pulse width by the pulse width setting circuit 8 has been completed, and the thus set value has been received.

(4) A character conversion end signal CED is being received from the character converting section 27.

Such conditions will be hereinafter referred to as pulse generating requirements.

In an initial condition of the bar code scanner, the scanning counter 4 is outputting a scanning end signal SED; the pulse width setting circuit 8 is outputting an initial value set therein; and the character converting section 27 (FIG. 11) is outputting a character conversion end signal CED. Thus, when a reading signal READ begins to be supplied from the reading signal latch circuit 1, the start pulse generating circuit 7 generates a start pulse ST of a width defined by the initial value of the pulse width setting circuit 8 since the pulse generating requirements are all satisfied. The start pulse ST is supplied to the scanning counter 4 and the line sensor 10. The line sensor 10 begins, in response to the start pulse ST, to read an image of the light receiving face of the line sensor by one by one picture element each time a clock $\phi 1$ is received thereby to read the bar code 6 by scanning. Consequently, the line sensor 10 outputs an electric signal which presents different levels at black and white bars of the bar code 6. Meanwhile, the scanning counter 4 begins to count the clock signal $\phi 1$ and stops outputting of the scanning end signal SED in response to the start pulse ST. When the scanning counter 4 counts the clock signal $\phi 1$ for one scanning operation of the line sensor 10, it begins to output the scanning end signal SED again. The scanning end signal SED is supplied to the start pulse generating circuit 7, scanning number counter 16, count value memory 20, margin judging circuit 211 and address counter 213.

The width of the start pulse ST defines a period of time required to charge capacitors of the line sensor 10 which make picture elements, and the level of an output signal of the line sensor 10 depends upon such charging period of time. The output signal of the line sensor 10 is supplied to the level detecting circuit 9, at which the level thereof is detected, and then, a pulse width which optimizes the level of the line sensor 10 is set by the pulse width setting circuit 8 in accordance with a result of such detection. When a scanning end signal SED is received from the scanning counter 4 again so that the pulse generating requirements are satisfied, the start pulse generating circuit 7 again generates a start pulse ST of the pulse width thus set by the pulse width setting circuit 8 to cause the line sensor 10 to start its scanning operation and cause the scanning counter 4 to start its counting operation.

The line sensor 10 scans the bar code 6 repetitively in this manner.

The output signal of the line sensor 10 is binary digitized in level by the binary digitizing circuit 14, and leading and trailing edges of pulses thereof are detected by the edge detecting circuit 18. Edge pulses EG outputted from the edge detecting circuit 18 are supplied to the timer counter 19 and address counter 213.

The timer counter 19 counts the clocks $\phi 2$ from the frequency dividing circuit 12 using each edge pulse EG from the edge detecting circuit 18 as a reset signal. Accordingly, the timer counter 19 outputs a count value N representative of a width of a bar of the bar code 6. The count value N is written into the count value memory 20 which is controlled by the count value memory controlling section 21. When the scanning counter 4 outputs a scanning end signal SED after count values N of all bars of the bar code 6 have been written into the count value memory 20, the count value memory 20 enters into a reading mode, in which the count values N written in the count value memory 20 are read out in the same order as in writing under the control of the count value memory controlling section 21.

Here, operation of the count value memory controlling section 21 is described in detail.

The counter value memory controlling section 21 includes, as described hereinabove, the margin judging section 211, fast/slow judging section 212, address counter 213, address decoder 214 and reset circuit 215. The margin judging section 211 detects a start and an end of the bar code 6 from count values N of the timer counter 19 for the blank portions (start and stop margins) provided at the front of the first bar and at the rear of the last bar of the bar code 6 and ratios between count values at the blank portions and bar portions of the bar code 6, and generates a start signal MST and an end signal MED corresponding respectively to the thus detected start and end of the bar code 6. However, when the start margin or stop margin is not sufficient, the margin judging section 211 outputs a margin error signal MER to the reset circuit 215. When a scanning end signal SED is being received from the scanning counter 4, the margin judging circuit 211 does not operate. The first/slow judging section 212 detects a magnitude of a count value N outputted from the timer counter 19 and outputs, when the distance between adjacent edge pulses EG from the edge detecting circuit 18 is excessively small or large, a fast/slow error signal to the reset circuit 215. If the printed bar code 6 on the print medium 5 is read as if a bar were narrowed or widened by blurring of ink thereof or by a damage or adhesion of dust thereto, then the fast/slow judging section 212 will output a fast/slow error signal. When a margin error signal MER is received from the margin judging section 211, or when a fast/slow error signal is received from the fast/slow judging section 212, the reset circuit 215 generates a reset signal and sends it to the address counter 213 and the count value memory 20.

When supply of a scanning end signal SED from the scanning counter 4 is stopped and the line sensor 10 starts its scanning operation, the address counter 213 receives a start signal MST from the margin judging section 211 and starts to count edge signals EG from the edge detecting circuit 18 from its initial value. A count value outputted from the address counter 213 is decoded by the address decoder 214 and supplied as an address signal ADR to the count value memory 20. When supply of a scanning end signal SED from the scanning counter 4 is stopped, the count value memory 20 enters a writing mode, in which a count value N outputted from the timer counter 19 is successively written into an address designated by an address signal ADR for the count value memory 20.

After count values N for all bars of the bar code 6 are written into the count value memory 20, an end signal MED is outputted from the margin judging section 211, and in response to such end signal MED, the address counter 213 stops its counting operation and is set to its predetermined initial value. Then, when a scanning operation of the line sensor 10 is completed and the scanning counter 4 outputs a scanning end signal SED, the count value memory 20 enters into a reading mode, in which the address counter 213 outputs a count value incremented one by one from its initial value in response to an internal clock. The count value is decoded into an address signal ADR for the count value memory 20 by the address decoder 214. Accordingly, the count values N written in the count value memory 20 are successively read out in the same order as in writing.

It is to be noted that, when the reset signal 215 outputs a reset signal, the address counter 213 is reset to its initial value and the count value memory 20 is cleared in response to the reset signal 215. The margin judging section 211 continues to output its margin error signal MER till a next margin judging operation, and the fast/slow judging section 212 continues to output its fast/slow error signal until a next scanning end signal SED is received from the scanning counter 4.

A count value N outputted from the count value memory 20 is supplied to the bit image converting section 22, at which it is compared with a preset threshold value so that it is converted into a bit image BI representative of a kind of the bar.

Referring now to FIG. 11, such bit image BI from the bit image converting section 22 is supplied to the character code bit image memory 23, stop code bit image memory 24 and bit image memory controlling section 25. The bit image memory controlling section 25 includes, as described hereinabove, the bit image memory address counter 251 and bit image memory address decoder 252. The bit image memory address counter 251 includes, as described hereinabove, the bit counter 2511 for counting a number of bit images BI (number of bars of the bar code 6 being read), and the character counter 2512 for counting a bit image BI for one character each time the bit counter 2511 counts such bit image BI for one character after it has counted a bit image BI corresponding to the start code at the front of the bar code 6. The bit image memory address decoder 252 decodes count values of the bit counter 2511 and the character counter 2512 to form and output address signals.

Here, the address signals outputted from the bit image memory address decoder 252 includes a decoded value of a count value from the bit counter 2511 and another decoded value of a count value from the character counter 2512, and the count value of the character counter 2512 remains equal to 0 while the bit counter 2511 counts a bit image BI of the stop code. When the bit counter 2511 counts a first bit image BI of a first bar of a character code, the character counter 2512 counts it so that the count value thereof becomes equal to 1, and after then, each time the bit counter 2511 counts a bit image BI for one character, the count value of the character counter 2512 is incremented by one.

Meanwhile, when the count value of the character counter 2512 is equal to 0, only an address designated by an address signal from the bit image memory address decoder 252 is set to the stop code bit image memory 24, and when the count value of the character counter 2512 is any other value than 0, only another address designated by an address signal from the bit image memory address decoder 252 is set to the character code bit image memory 23.

Thus, as a result of such operation of the bit image memory controlling section 25 and setting of addresses for the memories 23 and 24, a bit image BI of the stop code is written into the stop code bit image memory 24, and then character code bit images BI are written into the character code bit image memory 23. It is to be noted that, in the case of the interleaved 2-of-5 bar code system, bit images BI for black bars and bit images BI for white bars are written separately into the character code bit image memory 23.

After reading out of count values N from the count value memory 20 (FIG. 10) is completed and then writing of bit images BI into the character code bit image memory 23 and stop code bit image memory 24 is completed, the memories 23 and 24 enter into a reading mode. Meanwhile, the bit image controlling memory 25 starts to generate an address signal after the bit counter 2511 and character counter 2512 have been cleared. In response to such address signal, data SCD consisting of a bit image of the stop code are first read out from the stop code bit image memory 24 and supplied to the start/stop judging section 26, and data CCD consisting of a number of bit images equal to the number of bars for one character are read out successively from the character code bit image memory 23 and supplied to the character converting section 27. In this instance, in the bit image memory controlling section 25, the bit counter 2511 counts, each time the character converting section 27 converts data CCD for one character into a character, a number of internal clocks equal to the number of bars for one character and generates an address signal in accordance with which next data CCD should be read out from the character code bit image memory 23.

A pair of bit patterns consisting of different bit images which are obtained when a correct stop code used with the bar code 6 is read correctly in the forward and reverse directions are stored in a ROM not shown in the start/stop judging section 26 (such bit patterns will each be hereinafter referred to as registered stop code pattern). Thus, the start/stop judging section 26 compares a bit pattern of data SCD consisting of bit images from the stop code bit image memory 24 (such bit pattern will be hereinafter referred to as detected stop code pattern) with the registered stop code patterns to determine with which one of the registered stop code patterns the detected stop code patterns coincides. When either one of the registered stop code patterns coincides with the detected stop code pattern, this means that the reading direction of the bar code 6 is also determined, and accordingly, the start/stop judging section 26 supplies the data (stop code data) SSC corresponding the thus coincident registered stop code pattern to the output data converting section 33 and sends a converting direction instructing signal CDD to the character converting section 27.

However, when none of the registered stop code patterns coincides with the detected stop code pattern SCD, the start/stop judging section 26 outputs an error signal ERR1 to the error processing circuit 29.

A plurality of bit patterns of 1-byte data consisting of different bit images which are obtained when all character codes for use with the bar code system are read correctly in the forward direction are stored in a ROM not shown in the character converting section 27 (such bit patterns will each be hereinafter referred to as registered character code pattern). Thus, the character converting section 27 compares a bit pattern of 1-byte data CCD from the character code bit image memory 23 (such bit pattern will be hereinafter referred to as detected character code pattern) with the registered character code patterns to determine with which one of the registered character code patterns the detected character code pattern coincides. In this instance, when the bar code 6 is read in the reverse direction, the detected character code pattern CCD is reversed in bit order in response a converting direction instructing signal CDD from the start/stop judging section 26 and then compared with the registered character code patterns.

When the detected character code pattern CCD coincides with one of the registered character code patterns, the character converting section 27 outputs character data CD corresponding to the coincident registered character code pattern and sends them to the character code coincidence comparator 28 and the output data converting section 33. When the detected character code pattern CCD does not coincide with any one of the registered character code patterns, the character converting section 27 generates an error signal ERR2 and sends it to the error processing circuit 29. After all detected character code patterns for one scanning operation of the bar code 6 are converted into character data CD, the character converting section 27 generates a character conversion end signal CED and supplies it to the start pulse generating circuit 7 shown in FIG. 10. Consequently, the start pulse generating circuit 7 generates a start pulse ST, in response to which the line sensor 10 starts a next reading scanning operation for the bar code 6.

The character code coincidence comparator 28 has stored therein character data CD for one scanning operation from the character converting section 27, and compares the character data CD with character data CD supplied from the character converting section 27 as a result of a next scanning operation. When all of the corresponding character data coincide with each other, the character code coincidence comparator 28 outputs a coincidence pulse and supplies it to the data coincidence number counter 31. The data coincidence number counter 31 counts such coincidence pulse, and a count value of it is compared with a preset coincidence number value stored in the constant memory 30 by the data coincidence number comparator 32. When the count value of the data coincidence number counter 31 becomes equal to or higher than the present coincidence number value, the data coincidence number comparator 32 generates a reading completion signal REND1 and sends it to the output converting section 33. If some of the corresponding character data CD from the character converting section 27 obtained by the preceding scanning operation and the current scanning operation do not coincide with each other, then the character code coincidence comparator 28 outputs an error signal ERR3 to the error processing circuit 29 and clears the data coincidence number counter 31.

The output data converting section 33 fetches, for each scanning operation of the bar code 6, character data CD from the character converting section 27 and stop code data SSC from the start/stop judging section 26 so that it keeps latest data, and when a reading completion signal REND1 is received from the data coincidence number comparator 32, the output data converting section 33 converts the thus kept character data CD and stop code data SSC into data of a predetermined format and sends them to the host equipment (not shown). Further, the output data converting section 33 sends an indication instructing signal DIS for the indication of completion of reading to an indicating apparatus (not shown) such as a lamp or a buzzer. Also the output data converting section 33 generates a reset signal RST and initializes it itself. The reset signal RST is supplied to the reading signal latch circuit 1 and so forth to reset them. After the reading signal latch circuit 1 is reset in response to the reset signal RST, it stops outputting of a reading signal READ to stop reading of the bar code 6. Also the light irradiating section 2 is extinguished.

If coincidence between character data obtained by two successive scanning operations occurs successively by a number of times (for example, twice) defined by the preset fixed number value at the constant memory 30, then it is determined that the bar code 6 is read correctly, and the reading operation is completed. However, if such coincidence does not occur continuously by such number of times, then reading of the bar code 6 will be repeated. Then, if no reading completion signal REND1 is outputted from the data coincidence number comparator 32 even after a repetition of reading by a particular number of times, further reading of the bar code 6 is inhibited.

In particular, referring back to FIG. 10, the scanning number counter 16 is incremented by one each time the scanning counter 4 outputs a scanning end signal SED. The count value of the scanning number counter 16 represents a number of scanning operations of the line sensor 10 and is compared with a constant set in advance in the scanning number constant memory 15 by the scanning number comparator 17. When the count value of the scanning number counter 16 exceeds the preset constant, the scanning number comparator 17 outputs a reading end signal REND2 to the output data converting section 33 shown in FIG. 11.

Referring to FIG. 11, in response to the reading end signal REND2, the output data converting section 33 outputs a reset signal RST to initialize it itself without forwarding character data or stop code data to the host equipment. Thus, it is determined that reading of the bar code 6 has failed, and reading of the bar code 6 is suspended. Further, the output data converting section 33 sends an indication instructing signal DIS representative of a failure in reading to the indicating apparatus.

The error processing circuit 29 outputs, when any one of error signals ERR1, ERR2 and ERR3 is received, a character conversion reset signal CERT to initialize the count value memory controlling section 21 and bit image converting section 22 shown in FIG. 10, the character code bit image memory 23, stop code bit image memory 24, bit image memory controlling section 25, start/stop judging section 26 and character converting section 27 shown in FIG. 11 and so forth. When the character converting section 27 is initialized by the character conversion reset signal CERT, it outputs a character conversion end signal CED so as to generate a next start pulse ST from the start pulse generating circuit 7.

As described so far, the line sensor 10 scans to read the bar code 6 by a plurality of times, and when character codes coincide with each other continuously by a number of times equal to the preset coincidence number value of the constant memory 30, it is determined that reading of the bar code 6 has been performed correctly. Thus, the character codes are sent to the host equipment, thereby completing the reading operation.

By the way, in such a bar code scanner as described above, a reading error naturally occurs when a bar code on a print medium is low in quality such that it has a crushed or broken portion, a void or the like or the contrast of the bar code is too low or when a touching position of the bar code scanner with the print medium is not appropriate. However, there is a problem that much time is required for judgment of a reading error of such bar code.

Various cases will be described below.

First, when a bar code is read by means of such a bar code scanner as described above, depending upon a disposition of the bar code scanner on a printed area of the bar code on a print medium, the bar code may be scanned obliquely or a first or last portion of the bar code may not be read. Further, the printed area of the bar code may be soiled so that two adjacent black bars may be read as a single black bar in error, and a bar may lack due to an error in printing. In any of such cases, the number of bars read by the bar code scanner is different from an actual number of bars constituting the bar code.

Even upon reading of such a bar code as described just above, the conventional bar code scanner described above will operate in accordance with bars read thereby such that the timer counter 29 outputs a count value N; the bit image converting section 22 produces a bit image BI; the character converting section 27 produces a character code CD; and the start/stop judging section 26 produces a code SSC of the stop code pattern. However, if the number of bars read is wrong as described above, then this will be detected by the character converting section 27 and/or the start-stop judging section 26.

In particular, if the number of bars read is wrong, then either at least one of 1-byte data CCD outputted from the character code bit image memory 23 cannot be converted into character data CD or data SCD from the stop code bit image memory 24 do not represent the stop code.

The character converting section 27 compares a detected character code pattern of data CCD successively with the registered character code patterns, and when there is no registered character code pattern corresponding to the detected character code pattern, the detected character code pattern is not determined to be wrong until after it is compared with all of the registered character code patterns. Some bar code scanners are constituted such that such judging operation is performed not only once, but such operation is repeated by a predetermined number of times that, if a detected character code pattern supplied thereto is wrong, then the detected character code pattern is read from the character code bit image memory 23 after it is shifted by a one-bit distance and then it is compared similarly with the registered character code patterns.

While an error in number of bars read is detected through such processing, such processing requires a long period of time. When an error is judged with regard to the last place of a bar code, a further long period of time will be required.

An error of a bit image pattern of the stop code is judged through similar processing by the start/stop judging section 26.

Besides, the error judging processing is not performed until all count values N are written into the count value memory 20. Only this will bring about a delay in judgment of an error.

On the other hand, since the size of a scanning range of the line sensor on a print medium when the bar code scanner is touched with the print medium, a bar code which falls within the scanning range can be read by the bar code scanner. However, bar codes of various sizes are used conventionally depending upon applications thereof. Thus, when a bar code scanner of the type described above is used for reading of bar codes which are applied in various manners, there is no problem if a single bar code is included in a scanning range of a line sensor, but in case it is used to read, from within a table in which a large number of small bar codes are recorded in a juxtaposed relationship such as a television program table, a desired one of the bar codes, two or more bar codes may be included in the scanning range of the line sensor or the scanning range of the line sensor may be set across two or more bar codes. In such an instance, the following problem will take place. It is to be noted that, in the following description, the scanning range of the line sensor 10 shown in FIG. 10 covers an area of two bar codes.

When it is desired to read one of a large number of juxtaposed bar codes, the bar code scanner is touched with a print medium such that the desired bar code may be included in the scanning range of the line sensor.

Thus, if the bar to be read is denoted as bar code A, then it sometimes occurs that the desired bar code A falls within the scanning range of the line sensor 10 while an adjacent bar code B partially protrudes from the scanning range as seen in FIG. 12. In such an instance, the line sensor 10 reads the bar code A and the margin judging section 211 generates a start signal MST. Consequently, the address counter 213 starts its counting operation, and a count value N of the timer counter 19 with regard to the bar code A is stored into the count value memory 20. However, when the line sensor 10 subsequently starts to read the bar code B, the margin judging section 211 generates a start signal MST again, and consequently the address counter 213 starts its counting operation and then the count value N of the timer counter 19 with regard to the bar code B is written into the count value memory 20. However, because the bar code B partially protrudes from the scanning range of the line sensor 10, re-writing of the count value memory 20 is not performed with regard to the protruding portion of the bar code B. Accordingly, the count value memory 20 has a count value with regard to the bar code B and the count value N with regard to the bar code A.

If the count value N of the count value memory 20 is decoded for bit image conversion or character conversion as described above, normally an error occurs. Accordingly, although the desired bar code A is read by the line sensor 10 so that it may be decoded correctly, a decoding error occurs.

On the other hand, when such bar codes A and B are included in the scanning range of the line sensor 10 as a whole as seen in FIG. 13, only the count value N of the timer counter 19 with regard to the non-desired bar code B is stored in the count value memory 20 and then decoded, resulting in reading in error of the bar codes.

In order to prevent such circumstances, it may seem a possible solution to design the address counter 213 such that it may not be rendered operative, after it is rendered operative in response to a start signal MST from the margin judging section 211 and then put into a stopping condition in response to an end signal MED from the margin judging section 211, in response to another start signal MST from the margin judging section 211 until after it is cleared by a scanning end signal SED from the scanning counter 4. With such solution, in either of the cases of FIGS. 12 and 13, the count value N of the timer counter 19 with regard to the bar code B is not written into the count memory 20, and consequently, the bar code A will be decoded.

However, it sometimes occurs that the bar code A is so low in quality due to a crush, a break or a void or due to a low contrast that, even if the line sensor 10 reads the bar code A, the margin judging section 211 does not generate a start signal MST. In such case, the address counter 213 does not perform its counting operation, and the count value with regard to the bar code A is not written into the count value memory 20. Then, if the margin judging section 211 generates a start signal MST when the line sensor 10 subsequently reads the bar codes B, then the address counter 213 starts its counting operation. Consequently, the count value N of the timer counter 19 with regard to the bar code B is written into the count value memory 20, and this will cause such problems as described above.

If the bar code B read in error as described hereinabove with reference to FIG. 13 is decoded, then wrong character data will be sent from the output data converting section 33 to the host equipment, and the host equipment will perform wrong processing the user does not want. In case, for example, a bar code is read from a television program table based on a bar code system as described above to reserve a program, a bar code of data of a channel number, a data and so forth must be read in a predetermined order, but if such erroneous reading of a bar code as described above occurs, then the bar code may be read in a wrong order. In this instance, the host equipment will read the character data and execute processing in accordance with the character data and then indicate a result of such processing. Thus, the user must confirm the indication and correct errors if any, which will deteriorate the inputting efficiency and impose a considerable burden on the user.

In order to eliminate such disadvantages, processing for prevention of an error is conventionally performed on the host equipment side. For example, such adjacent bar codes A and B as shown in FIG. 12 or 13 represent different data of different channel numbers or dates and are different from each other in place numbers of characters or in letters or numerals to be used, and it is judged and indicated on the host equipment side whether or not character data of those data have been received in a predetermined order.

With such solution, however, while erroneous inputting to and erroneous operation of the host equipment are prevented, output data of a decoder of the bar code scanner are indicated as correct in accordance with the indicating signal DIS outputted from the converting section 33 but are indicated as wrong on the host equipment side. The user will thus be confused by the inconsistent indications.

Besides, by the time when the host equipment provides the indication after the bar code has been read, a long interval of time is required which is equal to the (period of time till decoding after reading of the bar code by the bar code scanner)+(transfer time of character data to the host equipment)+(time required for the judging processing by the host equipment). This will impose, together with the circumstance described hereinabove, a wasteful time and labor and a psychological burden on the user in such a manner that the bar code reading operation is disturbed in rhythm or the user feels tired.

Recently, a bar code system has been put into practical use wherein a plurality of stop codes are defined such that, when different ones of them are added to a bar code having same character codes, the bar code has different contents of information. In such bar code system, contents of the stop codes are more important than those of a stop code of a conventional bar code system.

In the case of such a bar code scanner of the touch type as described hereinabove with reference to FIGS. 10 and 11, the resolution of a lens of the optical image forming section 3 is lower at a peripheral portion than at a central portion thereof and besides is lower in brightness at a peripheral portion than at a central portion thereof. Thus, optimal sensitivity conditions of the lens are different between a central portion and a peripheral portion of the lens. In the bar code scanner described above, when a bar code is read, normally a stop code is read at a peripheral portion of the lens, and besides the output level of the line sensor 10 is optimized at a character code portion of a bar code, at which the reading time is longer than that for a stop code, by the level detecting circuit 9 and pulse width setting circuit 8 as described hereinabove with reference to FIG. 10. Consequently, erroneous reading of a stop code likely occurs, and the following problems take place.

Where the bar code system includes a single stop code as in conventional bar code systems, judgment of erroneous reading of such stop code is very easy. However, where a plurality of stop codes are defined as described above, even if a stop code is read erroneously from a bar code, then contents of it may casually coincide with contents of another stop code. Accordingly, erroneous reading of a stop code cannot be detected readily.

In this instance, registered stop code patterns as are read in both of the forward and reverse directions are stored individually for the different stop codes in the start/stop judging section 26, and a detected stop code pattern SCD supplied from the stop code bit image memory 24 is successively compared with the registered stop code patterns until coincidence thereof with one of the registered stop code patterns is detected. Consequently, if a stop code of a bar code is read erroneously and there casually is a registered stop code pattern corresponding to such erroneously read stop code, then although it is not correct information, stop code data SSC corresponding to the registered stop code pattern are supplied from the start/stop judging section 26 to the output data converting section 33. Further, if the character converting section 27 then performs character conversion of the same contents by a number of times provided by the preset coincidence number value of the constant memory 30, then the output data converting section 33 sends character data CD from the character converting section 27 and the stop code data SSC and further sends an indication instructing signal DIS representative of completion of reading to the indicating apparatus. The host equipment thus processes the thus received character data CD in accordance with the stop code data SSC.

Consequently, it is indicated on the bar code scanner in accordance with the indication instructing signal DIS that a bar code has been read regularly, but it is judged on the host equipment in accordance with the stop code data SSC that wrong character codes have been transmitted thereto, and it is indicated that input data are wrong. For example, in case a television program table is composed of bar codes, different stop codes may be applied to different bar codes for different information such as a channel number and a date. When a bar code of such television program table is read to reserve a program for a video tape recorder, the order of reading information of, for example, a channel number and a reserved date are determined in advance. However, if a stop code of the bar code of the channel number is read in error and consequently the stop/stop judging section 26 judges the stop code as stop code data of the bar code of the reserved date, then although character data of the channel number must be transmitted to the host equipment, the host equipment judges that character data CD of the reserved date have been transmitted thereto. Consequently, while it is indicated on the bar code scanner that regular reading has been performed, it will be indicated on the host equipment that wrong character data have been inputted thereto.

If the bar code scanner and the host equipment provide different indications in this manner, the user will not discover the cause and will be confused.

A similar problem takes place when a bar code is so low in quality due to a crush, a break or a void or due to an insufficient contrast that reading in error not only of a character code but also of a stop code occurs.

Further, the bar code scanner described above is constituted such that a bar code is read while changing reading conditions such that the pulse width of a start pulse is successively changed for each scanning operation to change the light receiving sensitivity of the line sensor 10 in order to search for conditions of a bar code which are immune to a soil, a void, a break or a contrast.

However, even when the reading conditions are successively changed, the start/stop judging section 26 and the character converting section 27 are operating, and accordingly, when a stop code or a character code of a bar code is read in error due to an influence of a soil, a void, a break or a contrast, even if a detected stop code pattern SCD from the stop code bit image memory 24 is different for each reading of the bar code, since a large number of registered stop code patterns are provided in the start/stop judging section 26, the detected stop code patterns SCD may coincide with some of the registered stop code patterns, and consequently, if the character converting section 27 outputs character codes CD of the same information, even if they are wrong, by a number of times provided by the preset coincidence number value of the constant memory 30, then the character codes CD and stop code data SSC are transmitted to the host equipment. Consequently, reading of the bar code is ended in response to a reset signal RST from the output data converting section 33 before suitable reading conditions immune to a soil, a break, a void or a contrast of the bar code are reached.

Another case is possible wherein such a situation takes place that, even if a bar code is actually read in error, it is judged on the bar code scanner side that reading of a bar code has been performed correctly on the bar code scanner side and decoded data of the bar code are transmitted to the host equipment.

In particular, referring to FIG. 11, even if a bar code is read in error in number of places, the bit image memory controlling section 25 writes all bit images BI supplied from the bit image converting section 22 into the stop code bit image memory 24 and the character code bit image memory 23, and then even if data SCD and CCD from the memories 24 and 23 are judged to have some errors in contents thereof by the start/stop judging section 26 and the character converting section 27, if they are processed regularly, then the bit image memory controlling section 25 reads out the data SCD and CCD successively from the memories 24 and 23, respectively. Then, if a coincidence pulse is outputted from the character code coincidence comparator 28 by a number of times defined by the present coincidence number value of the constant memory 30, then the output data converting section 33 sends character data CD from the character converting section 27 and stop code data SSC from the start/stop judging section 26 to the host equipment.

In this manner, the bar code scanner does not perform detection of a number of places of a bar code read thereby, and accordingly, even if a bar code is read with a wrong number of places, decoded data are transmitted to the host equipment. Consequently, the host equipment will process the received decoded data, but since the number of places is wrong, the host equipment will naturally malfunction and consequently will indicate that there is an error in decoded data.

The user will thus perform, looking at the error indication, a reading operation of the bar code again. However, considerable time is required until the host equipment makes the error indication after the bar code scanner has been touched with the print medium. Consequently, the efficiency of a bar code reading operation is deteriorated and a considerable burden is imposed on the user.

In order to eliminate such disadvantage, due to the fact that the number of places of a bar code is specified in accordance with a bar code system employed, such measure is normally taken that a number of places of decoded data supplied from a bar code scanner is checked on the host equipment side. The method prevents wasteful data processing by the host equipment. Even with the method, however, it is indicated on the bar code scanner in accordance with an indication instructing signal DIS from the output data converting section 33 that regular reading of a bar code has been performed, but on the host equipment, an error indication is provided. When there is a difference between the two indications in this manner, the user will not know which one of the indications is correct or what makes such difference, and will be confused.

Further, while the time until the host equipment makes an error indication after the bar code scanner has been touched with the print medium is decreased due to lack of data processing by the host equipment comparing with the preceding case described above, it still is considerably long.

In the case described above, the number of bit images BI written into the character code bit image memory 23 in FIG. 11 is equal, in spite of an error in number of places, to a value of a place number × number of bars of one character code.

Such a situation, however, seldom occurs, and normally, if there is an error in number of places, then the number of bit images of data CCD read out at last from the character code bit image memory 23 in FIG. 11 is smaller than the number of bars of one character. In such an instance, the character converting section 27 cannot convert the data CCD into a character, and consequently, it determines that there is no registered character code pattern corresponding to the data CCD and outputs an error signal ERR2 in order to start next bar code reading.

If reading of a bar code with a wrong number of places is repeated to repeat such operation as described just above, then wrong decoded data will not be transmitted to the host equipment. Then, even if reading of the bar code is performed by a number of times defined by the constant of the scanning number constant memory 15, if reading of the bar code with a wrong number of places is repeated, then reading of the bar code is finally stopped in response to a reset signal RST and it is indicated in accordance with an indication instructing signal DIS from the output converting section 33 that reading is impossible.

On the bar code scanner, however, no indication is provided until impossible reading is indicated in this manner, and the user continues to consider for the interval of time that a reading operation of a bar code is proceeding regularly. In the bar code scanner, the width of a start pulse is changed for each scanning operation of the line sensor so that reading of a bar code may be performed in optimal conditions, and the time until decoded data are outputted to the host equipment and completion of reading is indicated after reading of a bar code has been started is normally a very short time of 0.3 seconds or so. However, when the indication that reading is impossible is to be made, a considerably long period of time of 1 second or so comparing with the period above is required for such indication, which will give an unfamiliar-feeling to the user. Besides, when the indication after it has been waited for a longer interval of time than an ordinary interval of time is that reading is impossible, the rhythm of the user in reading operation may be missed to give a feeling of fatigue to the user.

A bar code read cannot be decoded also in the following cases: when a bar code is so low in quality due to a crush, a break or a void or in contrast that the bar code is read in error; when the bar code scanner is touched at such an inappropriate position on a print medium that the bar code partially protrudes from the scanning range of the line sensor and consequently is read only at a portion thereof; when the bar code on the print medium has such a stain or a damage between black bars thereof as is read as a bar. The reason why a bar code cannot be decoded is that such a situation arises that at least one of detected character code patterns CCD of characters outputted from the character code bit image memory 23 in FIG. 11 coincides with none of the registered character code patterns set in the character converting section 27.

When a detected character code pattern CCD which does not coincide with any one of the registered character code patterns is supplied from the character code bit image memory 23, the character converting section 27 generates an error signal ERR2 and sends it to the error processing circuit 29, at which a character conversion reset signal CERT is generated to stop character conversion and start next reading of the bar code.

However, since the character converting processing by the character converting section 27 is processing to successively compare a detected character code pattern CCD with the registered character code patterns to search for a registered character code pattern which coincides with the detected character code pattern CCD, a long period of time is required for such converting processing, and the processing is a data processing operation which requires the longest period of time among various data processing operations of the bar code scanner. A detected character code pattern which does not coincide with any one of the registered character code patterns as described above is not found until after it is compared with all of the registered character code patterns, and particularly when such detected character code pattern originates from the last character code of the bar code being read, a very long period of time is required until it is found as such detected character code pattern.

In the bar code scanner described above, the width of a start pulse is changed to successively change the light receiving sensitivity of the line sensor for each reading operation of the line sensor so that decoding of a bar code may be performed while searching for conditions in which it is immune to an influence of a soil, a void, a break or a contrast of the bar code. Even with the method, however, a bar code may not be decoded by a plurality of reading operations from the causes described above, and if a number of reading scanning operations of the bar code defined by the constant of the scanning number constant memory 15 are performed finally, then the output data converting section 33 outputs a reset signal RST to suspend reading of the bar code and simultaneously outputs an indication instructing signal DIS to make an indication that reading is impossible.

However, a very long period of time is required for such indication of impossible reading, and the user will not know for the interval of time that the bar code is being read but in error. Further, while the time required for regular reading and decoding of a bar code is normally a very short time of 0.3 seconds or so, one second or so is required until the indication that reading is impossible is provided. Consequently, similarly as in the case described hereinabove, the user will have an unfamiliar feeling in operation and also have a considerable feeling of fatigue.

SUMMARY OF THE INVENTION

It is an object of the present invention to provide an optical reading apparatus wherein reading of a bar code in error can be detected rapidly.

In order to attain the object, according to an aspect of the present invention, there is provided an optical reading apparatus, which comprises optical reading means for optically reading a bar code printed on a print medium to develop an electric signal, means for binary digitizing the electric signal into a binary signal, an edge detecting circuit for detecting edges of the binary signal to produce edge signals, means for generating clocks, a timer counter for counting the clocks for each edge signal to produce a count value corresponding to a width of a bar of the bar code, a count value memory for storing the count value therein, means for converting such count values successively read out from the count memory into bit images upon completion of reading of the bar code, means for producing character data representative of character codes of the bar code from the bit images, counting means for counting the edge signals during reading of the bar code, and judging means for judging coincidence or incoincidence between the count value of the counting means at a point of time at which reading of the bar code is completed and a value equal to a number of edges of bars forming the bar code to detect an error in reading of the bar code.

In the optical reading apparatus, an edge signal is produced for each of edges of bars of a bar code actually read by the optical reading means, and a count value of such edge signals corresponds to the number of the bars actually read. If the number of the bars actually read is wrong, then the count value is different from the value equal to the number of edges of bars of a bar code specified in accordance with a bar code system used. Accordingly, comparison between the specified number of edges and the count value will provide judgment whether or not the number of bars actually read is wrong.

Counting of edge signals is performed while the count value of the timer counter is written into the count value memory, and when all such count values are written into the count value memory, a total number of bars actually read is obtained. Thus, with the optical reading apparatus, since an error in reading of a bar code can be detected when all of count values of bars read are obtained, the time required for judgment of such error is decreased significantly.

According to another aspect of the present invention, there is provided an optical reading apparatus, which comprises a line sensor having a scanning range of a size corresponding to a plurality of bar codes printed on a print medium for scanning the scanning range to read the bar codes, means for binary digitizing an output signal of the line sensor into a binary signal, an edge detecting signal for detecting edges of the binary signal to generate edge signals, means for generating clocks, a timer counter for counting the clocks for each edge signal to produce a count value corresponding to a width of a bar of the bar codes, a count value memory for storing such count values therein, means for decoding the count values stored in the count value memory to produce character data of the bar codes, judging means for judging whether or not the scanning position of the line sensor is within a predetermined scanning range which is a particular range for one bar code within the scanning range of the line sensor, and writing means responsive to a result of judgment by the judging means for allowing only the count value of the timer counter for a bar code which has a starting end within the reading range to be written into the count value memory thereby to allow only one of a plurality of bar codes included in the scanning range of the line sensor to be read and decoded by the optical reading apparatus.

In the optical reading apparatus, the line sensor performs a reading scanning operation over the entire scanning area, but only count values of the timer counter with regard to a bar code having a starting end within the reading range are written into the count value memory and then decoded. Accordingly, if the optical reading apparatus or a print medium on which a plurality of bar codes are printed is operated so that at least a starting point of a desired one of the bar codes on the print medium may be positioned within the reading range, then the desired bar code will be decoded without fail unless there is no error in reading, and another undesired bar code will not be decoded in place of the desired bar code.

Accordingly, with the optical reading apparatus, even if the line sensor scans a plurality of bar codes, normally a desired one of the bar codes is read and decoded, and an operation of reading and decoding another bar code in error can be prevented.

According to a further aspect of the present invention, there is provided an optical reading apparatus, which comprises optical reading means for optically reading a bar code printed on a print medium and belonging to a bar code system in which a plurality of kinds of stop code are defined, judging means for judging the kind of the stop code of the bar code read by the optical reading means, means for decoding the bar code whichever kind of stop code the bar code has, comparing means for comparing a plurality of stop code data obtained from the stop code of the bar code in a plurality of repetitive reading operations of the bar code with each other to detect whether or not all of the stop code data coincide with each other, and means for allowing, when the comparing means detects that all of the stop code data do not coincide with each other, the optical reading means to immediately perform a next reading operation of the bar code.

If there is an error in reading of a stop code of a bar code due to an influence of a lens or an influence of a soil, a void, a break or a contrast, then a pattern of the stop code is seldom constant among a plurality of reading scanning operations of the bar code and is normally different for different reading scanning operations because the light receiving sensitivity of the line sensor is adjusted for each reading scanning operation.

Thus, in the optical reading apparatus, when one of stop code data obtained is different from the other stop code data, even if the pattern of the stop code of the stop code data coincides casually with one of a plurality of registered stop code patterns, the judging means judges that the stop code data are wrong and generates a signal to start a next reading scanning operation of the bar code. Such operation is repeated until the stop code is read correctly.

Thus, with the optical reading apparatus, if a stop code of a bar code belonging to a bar code system in which a plurality of kinds of stop code are defined is read in error, such error is detected with certainty and a next reading operation of the bar code is started immediately. Accordingly, it can be prevented to send wrong decoded information of the bar code to a host equipment, and the bar code is always read correctly.

According to a still further aspect of the present invention, there is provided an optical reading apparatus, which comprises optical reading means for optically reading a bar code printed on a print medium and consisting of a plurality of kinds of bars, means for producing, for each of bars of the bar code read by the optical reading means, bit images representative of the kind of the bar, means for separating the bit images of the bars into groups each including a number of bit images equal to the number of the bars which form a character code of the bar code, means for converting the bit images of each group into character data, detecting means for counting the bit images to detect a number of character codes of the bar code read by the optical reading means, comparing means for comparing a detected value of the detecting means and a reference value equal to a total number of character codes determined in advance for the bar code, and means for allowing, when the detected value and the reference value do not coincide with each other, said optical reading means to immediately start a next reading operation of the bar code.

With the optical reading apparatus, since bit images are counted to judge whether or not a bar code is read with a correct number of places, an error in reading of the bar code with a wrong number of places is detected before decoding processing of the bit images into character data. Accordingly, a time required to detect an error in reading of a bar code with a wrong number of places can be decreased significantly.

According to a yet further aspect of the present invention, there is provided an optical reading apparatus, which comprises optical reading means for optically reading a bar code printed on a print medium and consisting of a plurality of kinds of bars, bit image producing means for producing, for each of bars of the bar code read by the optical reading means, bit images representative of the kind of the bar, storage means into which bit images successively produced by the bit image producing means are successively stored, means for reading out, after the bit images of the entire bar code are written into the storage means, the bit images from the storage means, means for converting the bit images read out from the storage means into character codes, detecting means for detecting, for each predetermined number of bit images equal to a predetermined correct number of bars which are to form a character code of the bar code, a number of bit images of bars of a particular one of the kinds, comparing means for comparing a detected value by the detecting means and a reference value equal to the predetermined correct number, and means for allowing, when the detected value and the reference value do not coincide with each other, the optical reading means to immediately perform a next reading operation of the bar code.

With the optical reading apparatus, it can be judged whether or not the number of thick or thin bars of a bar code obtained from bit images before conversion into character data is correct, and an error in reading of the bar code can be detected before converting processing into character data. Thus, an error in reading of a bar code caused by deterioration in quality of the bar code or incomplete reading of the bar code or by reading of a stain, a damage or the like between bars of the bar code can be detected before decoding operation. Consequently, a time required to detect an error in reading of a bar code can be decreased significantly.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
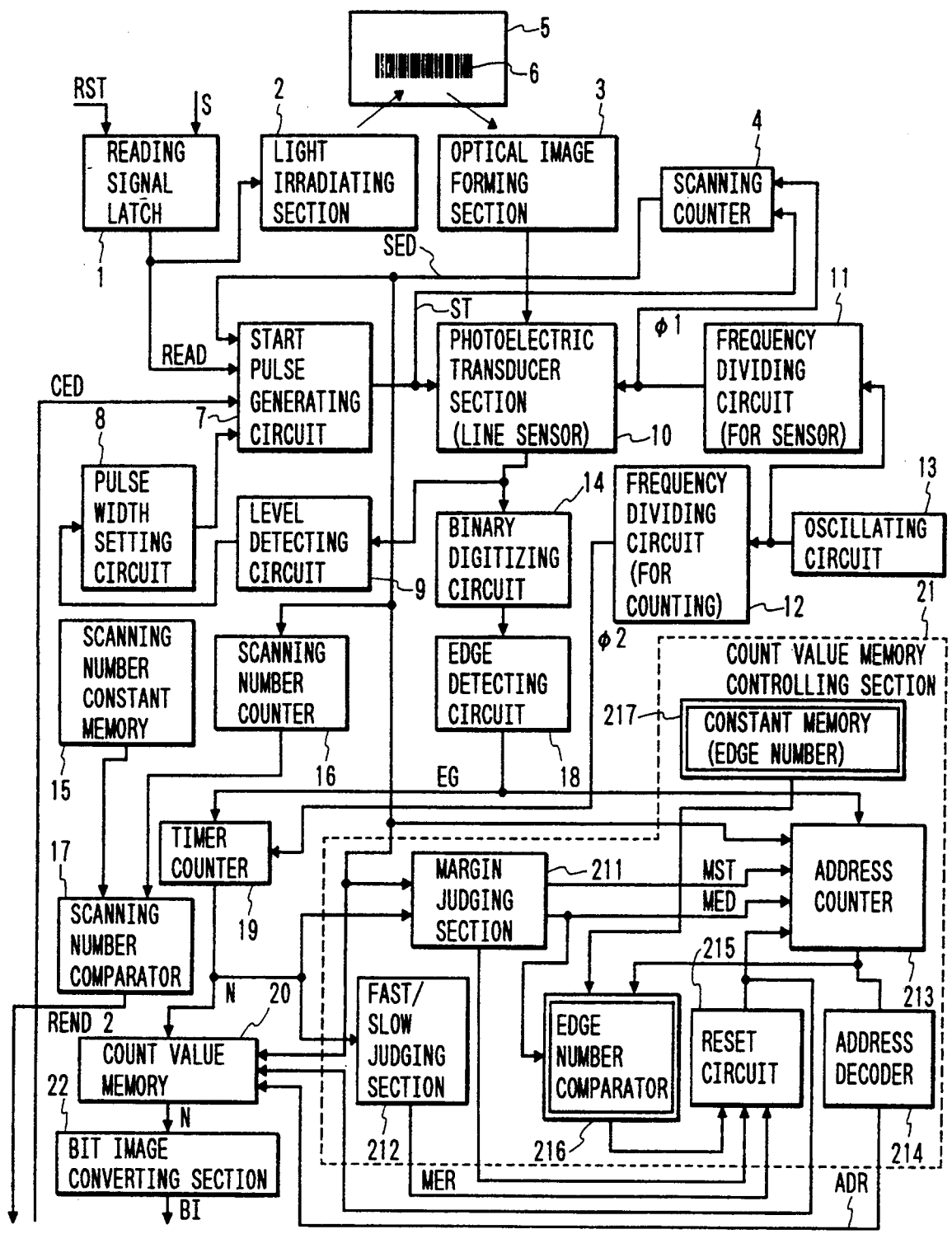
FIG. 1 is a block diagram of a portion of an optical reading apparatus showing a first preferred embodiment of the present invention.
Figure 2:
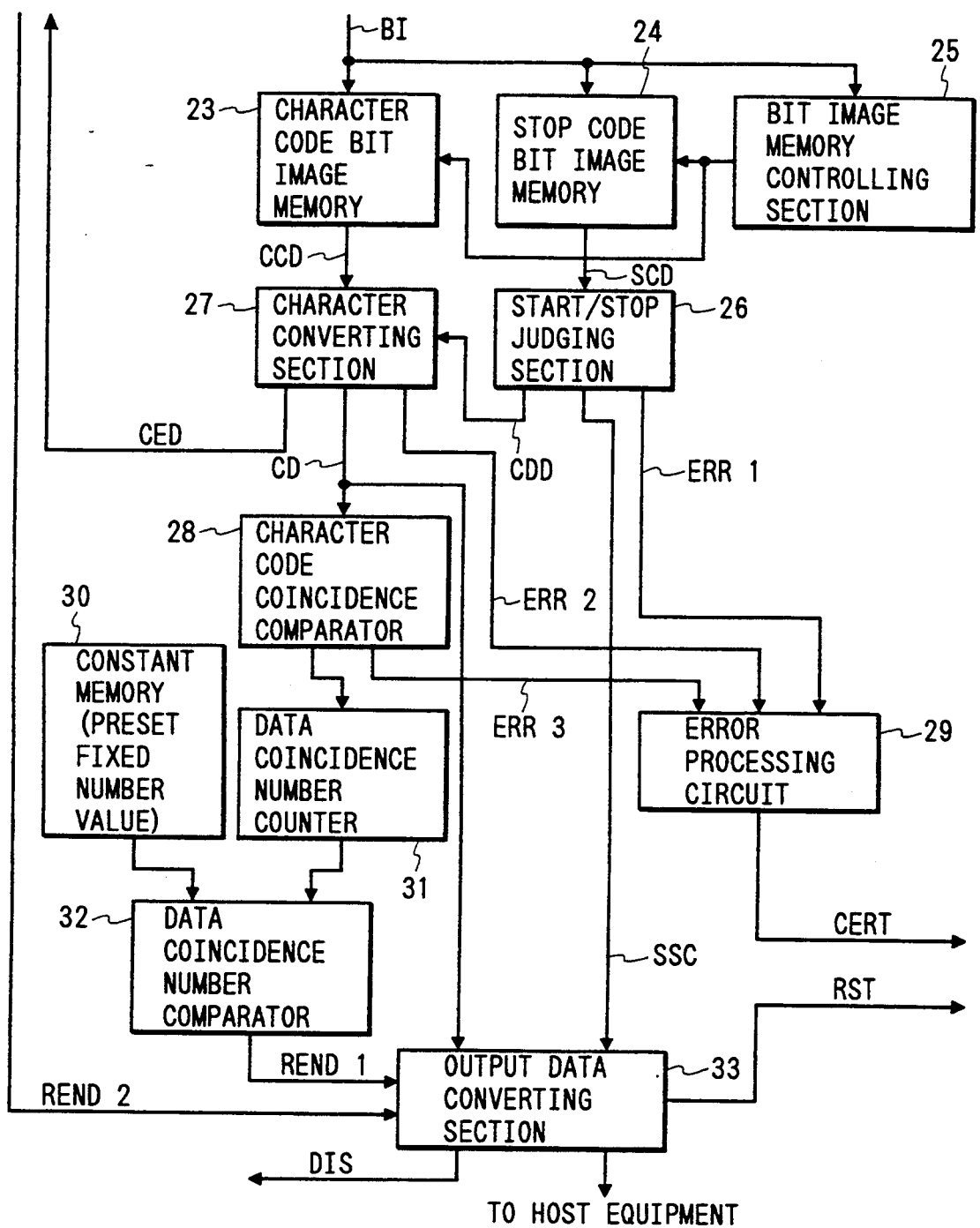
FIG. 2 is a similar view but showing the remaining portion of the optical reading apparatus of FIG. 1.

Referring first to FIGS. 1 and 2, there is shown an optical reading apparatus according to a first preferred embodiment of the present invention. The optical reading apparatus shown has a generally common construction to the conventional optical reading apparatus described hereinabove with reference to FIGS. 10 and 11, and overlapping description of such common construction is omitted to avoid redundancy. The optical reading apparatus is different from the conventional optical reading apparatus in that the count value memory controlling section 21 additionally includes a constant memory 217 and an edge number comparator 216. Though not shown as such, the bit image memory controlling section 25 has the same construction as the bit image memory controlling section 25 of the conventional optical reading apparatus.

The total number of bars of a bar code 6 depends upon a bar code system employed and is given, in the case of the interleaved 2-of-5 bar code system, by 2×(number of bars of start code)+2×(number of bars of stop code)+5×(number of character codes)

The total number of edges of bars is given by 2n where n is a total number of bars, and the constant memory 217 has the value 2n of the number of edges stored therein.

After the line sensor 10 starts its reading scanning operation of the bar code 6, an edge signal EG is outputted from the edge detecting circuit 18 at a timing at which an edge of any bar of the bar code 6 is read. The edge signal EG is supplied to the timer counter 19 while it is counted by the address counter 213 of the count value memory controlling circuit 21. After the reading operation of the bar code 6 comes to an end and a count value N of the timer counter 19 is written into the count value memory 20, the address counter 213 stops its counting operation in response to an end signal MED from the margin judging section 211. In this instance, the count value of the address counter 213 has a value 2n' which is twice that of a number of bars of the bar code 6 actually read by the line sensor 10.

The edge number comparator 216 starts its operation in response to an end signal MED from the margin judging section 211 and fetches and compares the edge number value 2n from the constant memory 217 and the count value 2n' from the address counter 213 with each other. When 2n'=2n, the count value N is read out from the count value memory 20 and processing such as bit image conversion and character conversion is performed similarly as in the conventional optical reading apparatus shown in FIGS. 10 and 11. But when 2n'≠2n, the edge number comparator 216 outputs an error signal to the reset circuit 215. In response to such error signal, the reset circuit 215 outputs a reset signal to reset the address counter 213 and the count value memory 20.

After the count value memory 20 is reset, the character converting section 27 continues to develop a character conversion end signal CED because no data CCD are received from the character bit image memory 23. Consequently, when the line sensor 10 completes its scanning operation and a scanning end signal SED is supplied from the scanning counter 4 to the start pulse generating circuit 7, since the pulse generating requirements described hereinabove are all satisfied, the start pulse generating circuit 7 generates a start pulse ST to start another reading scanning operation of the line sensor 10.

In this manner, in case there is an error in number of bars of the bar code 6 read by the line sensor 10, the line sensor 10 starts its another reading scanning operation after completion of its reading scanning operation, and such reading scanning operation is repeated so far as the number of bars read is not correct. Then, when the count value of the scanning number counter 16 comes into coincidence with the constant of the scanning number constant memory 15, the scanning number comparator 17 outputs an error signal REND2. In response to such error signal REND2, the output data converting section 33 generates a reset signal RST to stop the reading operation of the bar code 6 and outputs an indication instructing signal DIS representing judgment of an error.

Accordingly, an erroneous operation arising from an error in number of bars read can be judged without executing such processing as bit image conversion or character conversion, and a result of such judgment can be known rapidly to the user.

Figure 3:
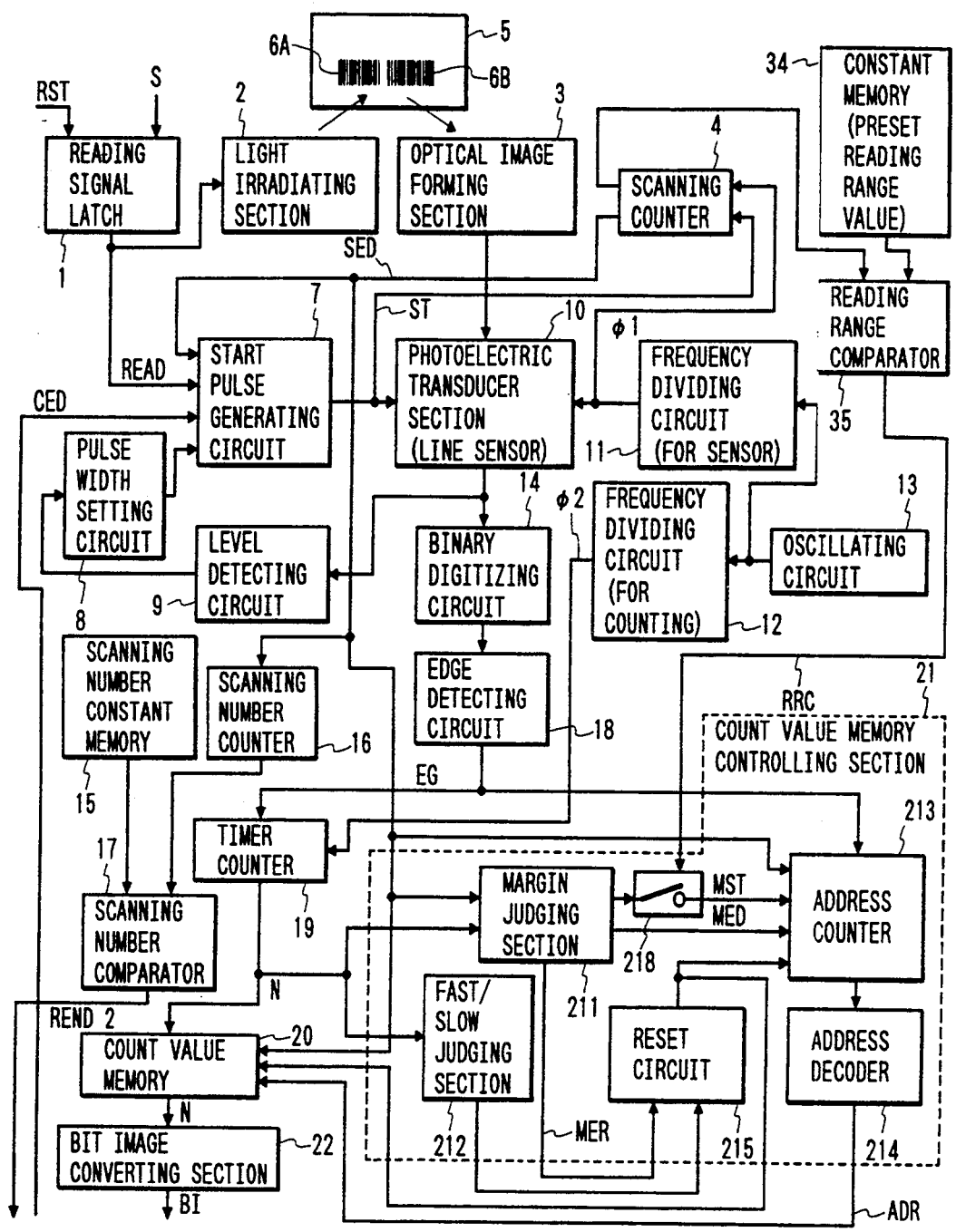
FIG. 3 is a block diagram of a portion of another optical reading apparatus showing a second preferred embodiment of the present invention.
Figure 4:
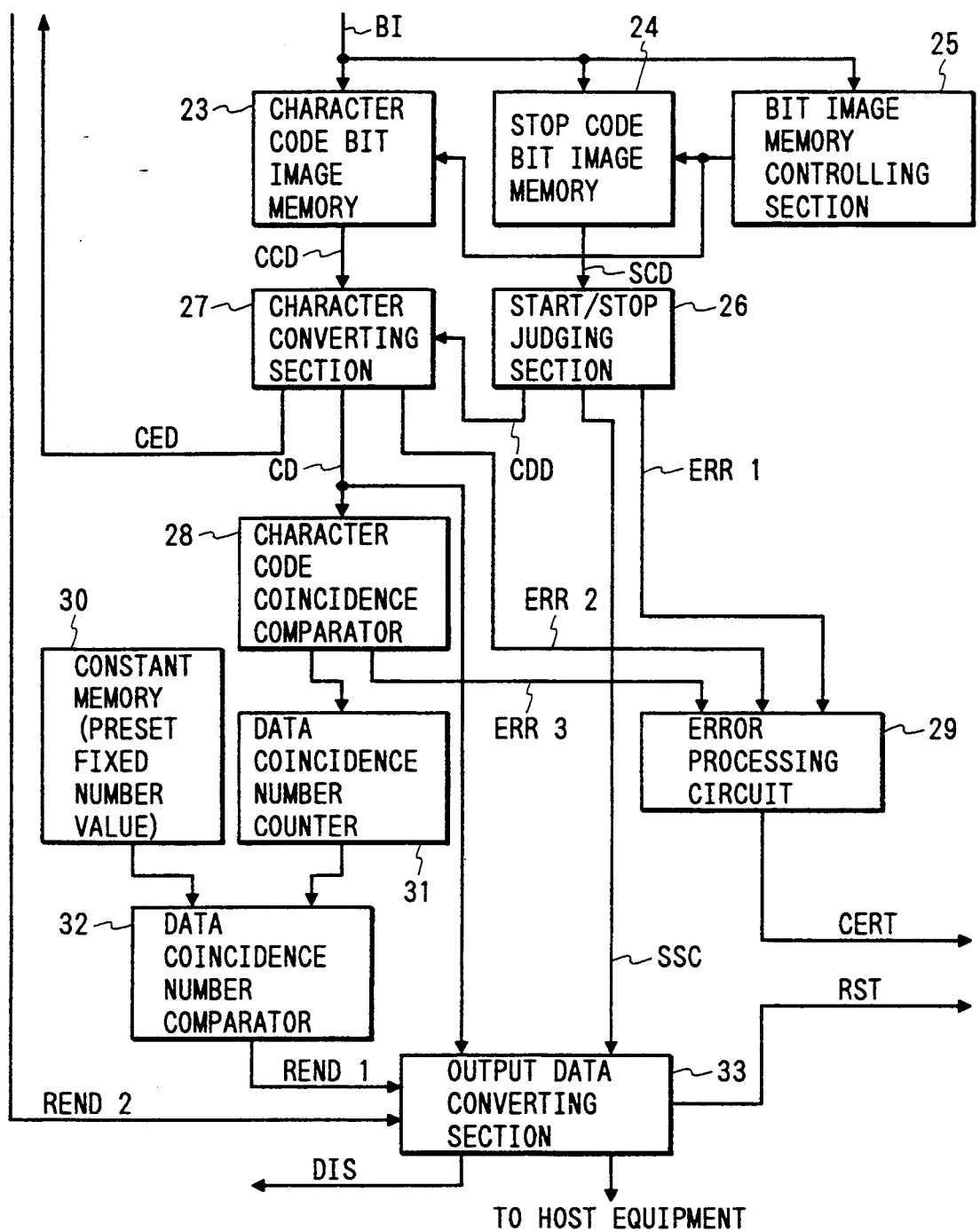
FIG. 4 is a similar view but showing the remaining portion of the optical reading apparatus of FIG. 3.

Referring now to FIGS. 3 and 4, there is shown an optical reading apparatus according to a second preferred embodiment of the present invention. Also the optical reading apparatus shown has a generally common construction to the conventional optical reading apparatus described hereinabove with reference to FIGS. 10 and 11, and overlapping description of such common construction is omitted to avoid redundancy. The optical reading apparatus is different from the conventional optical reading apparatus in that it additionally includes a constant memory 34 and a reading range comparator 35 and the count value memory controlling section 21 thereof additionally includes a switch 218.

Referring particularly to FIG. 3, the scanning range of the line sensor 10 has a size which includes n (n is an integer equal to or greater than 2; the following description proceeds on the assumption of n=2) bar codes on a print medium 5. A portion of the scanning range which has a size corresponding to a single bar code is determined as a reading range, and upper and lower limit values of a counting range of the scanning counter 4 when the line sensor 10 scans the reading range are stored as preset reading range values in the constant memory 34.

After the line sensor 10 starts a reading scanning operation, the scanning counter 4 counts a clock signal $\phi 1$ from the frequency dividing circuit 11, and a count value of the scanning counter 4 and the preset reading range values of the constant memory 34 are compared with each other by the reading range comparator 35. The reading range comparator 35 outputs a detection signal RRC which presents a high level when the count value of the scanning counter 4 falls between the upper and lower limit values of the preset reading range values (that is, when the position of the line sensor 10 during scanning remains within the reading range) but presents a low level when the count value of the scanning counter 4 does not fall within the upper and lower limit values of the preset reading range values (that is, when the position of the line sensor 10 during scanning is outside the reading range). In the count value memory controlling section 21, a start signal MST outputted from the margin judging section 211 is supplied to the address counter 213 by way of the switch 218, which is controlled by a detection signal RRC from the reading range comparator 35 such that it presents an on-state when the detection signal RRC has a high level but presents an off-state when the detection signal RRC has a low level.

Thus, if it is assumed here that the front half of the scanning range of the line sensor 10 which has a size corresponding to a bar code and two bar codes 6A and 6B are printed on the print medium 5 as seen in FIG. 3, when at least a front portion of the bar code 6A on the print medium 5 is within the reading range, the timing at which a start signal MST is outputted from the margin judging section 211 upon reading of the bar code 6A falls within a period of time during which the switch 218 is in an on-state, and consequently, the start signal MST is supplied to the address counter 213 by way of the switch 218. Accordingly, the address counter 213 counts an edge signal EG, and consequently, a count value N of the timer counter 19 for the entire bar code 6A is written into the count value memory 20.

In this instance, the next bar code 6B is outside the reading range without fail. Accordingly, when the line sensor 10 scans the bar code 6B, the switch 218 is in an off-state. Consequently, even if the margin judging section 211 generates a start signal MST for the bar code 6B, the start signal MST is not be supplied to the address counter 213.

Figure 5:
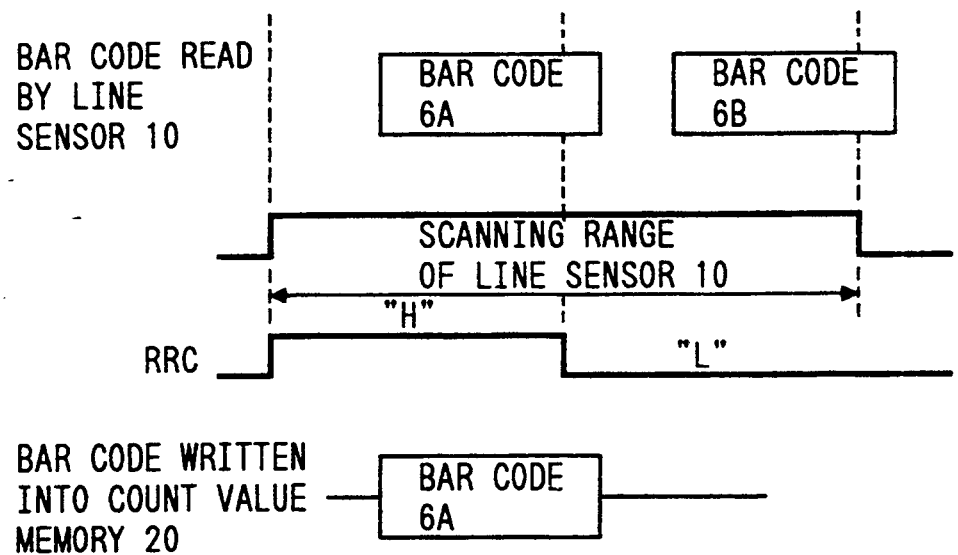
FIG. 5 is a diagram illustrating a reading operation of a bar code by the optical reading apparatus shown in FIGS. 3 and 4.
Figure 6:
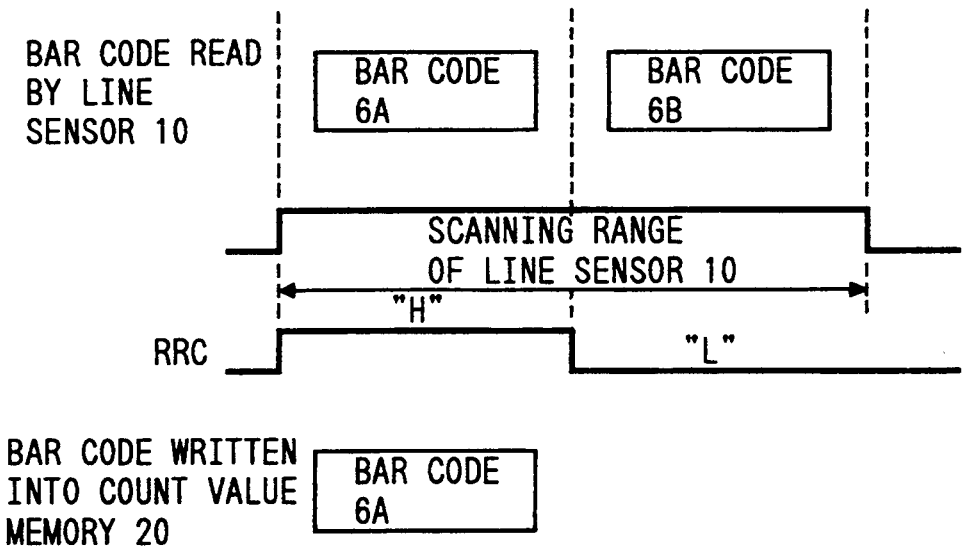
FIG. 6 is a similar view but illustrating another reading operation of a bar code by the optical reading apparatus shown in FIGS. 3 and 4.

Accordingly, if a front portion of the bar code 6A is within the reading range and consequently a start signal MST from the margin judging section 211 as a result of reading of the bar code 6A is within the period of an on-state of the switch 218 as seen in FIG. 5 or 6, then a count value N of the timer counter 19 with regard to the bar code 6A is written into the count value memory 20 without fail. Consequently, decoding will be performed for the bar code 6A thus read. Then, the bar code 6B other than the bar code 6A will not be decoded irrespective of reading of the bar code 6A.

In this manner, when at least a front portion of a desired bar code to be read falls within the set reading period, reading and decoding of the desired bar code are performed with certainty, and even if the line sensor 10 scans a plurality of bar codes and even if there is an error in reading of a desired bar code, a wrong bar code will not be read nor decoded. Accordingly, correct reading and decoding of a bar code is performed normally.

Figure 7:
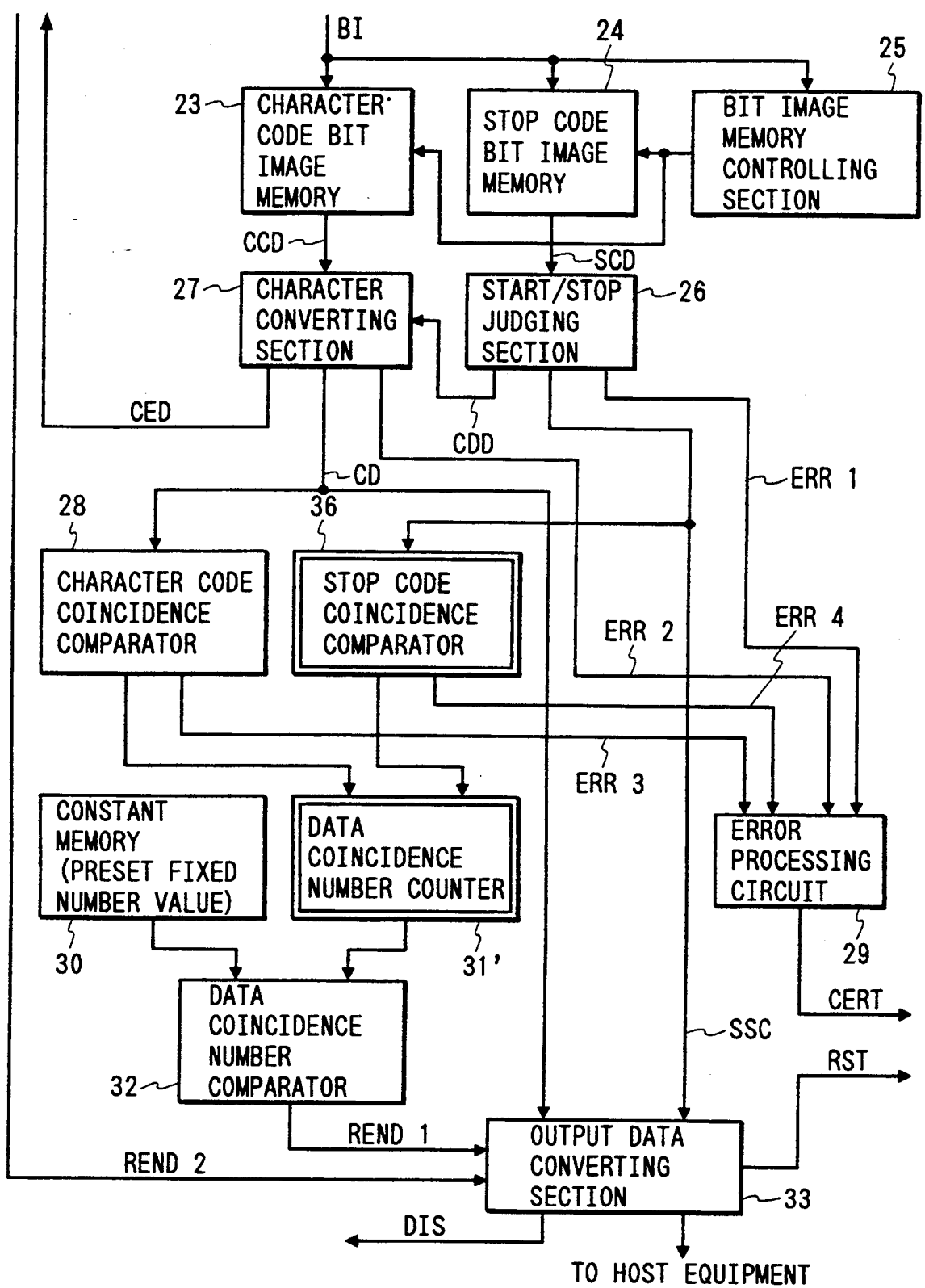
FIG. 7 is a block diagram of a portion of a further optical reading apparatus showing a third preferred embodiment of the present invention.
Figure 10:
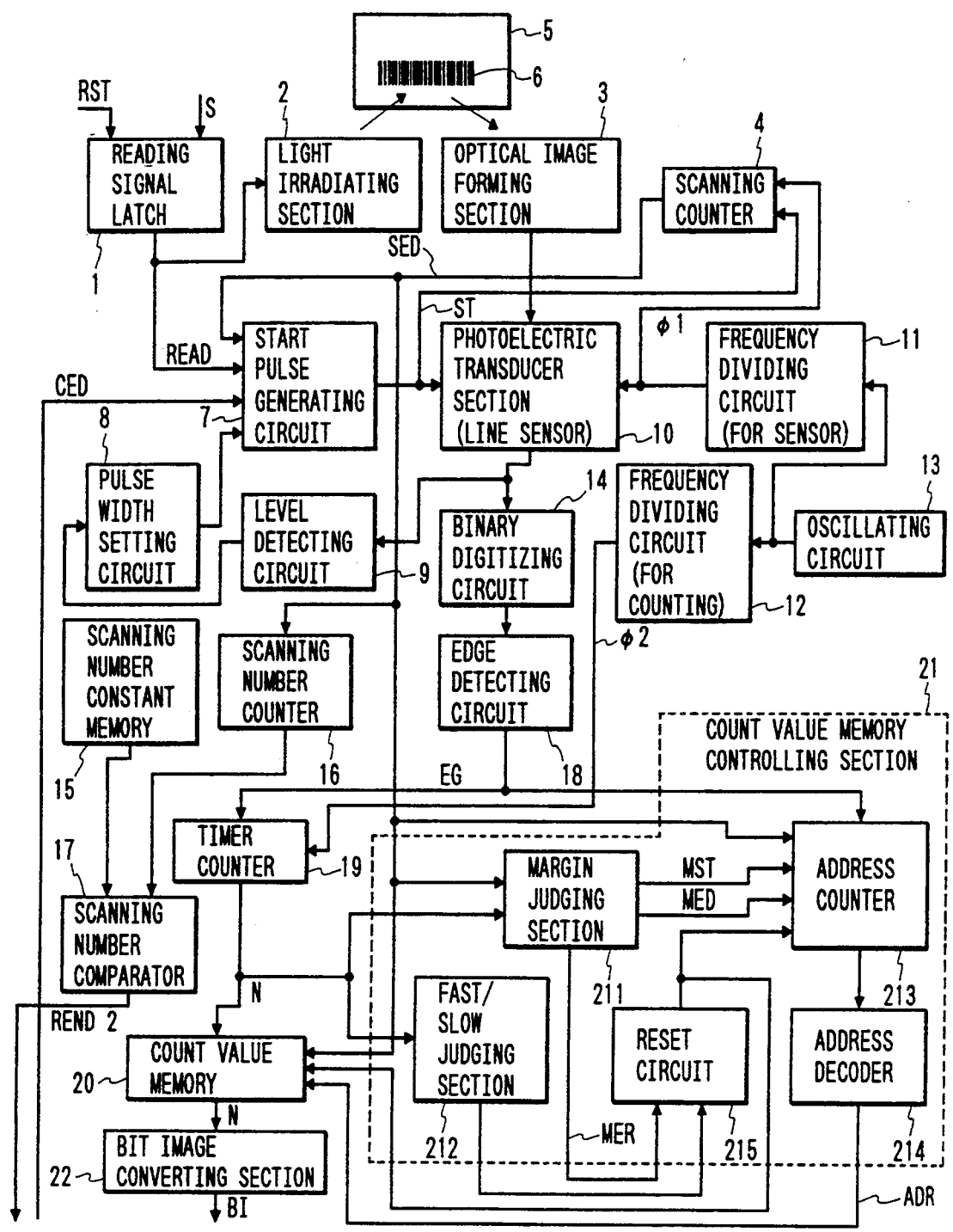
FIG. 10 is a block diagram of a portion of a conventional optical reading apparatus.
Figure 11:
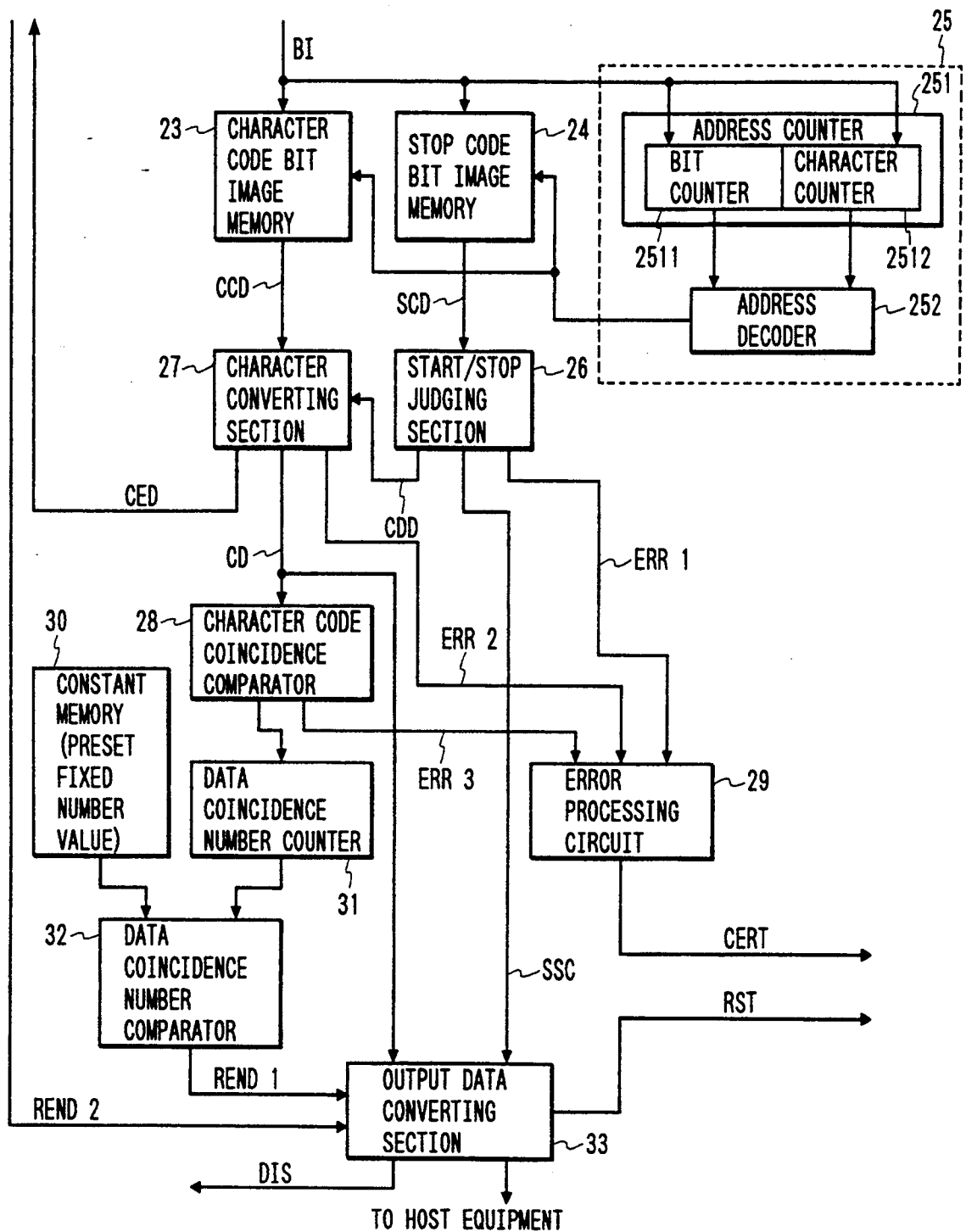
FIG. 11 is a similar view but showing the remaining portion of the optical reading apparatus of FIG. 12.
Figure 12:
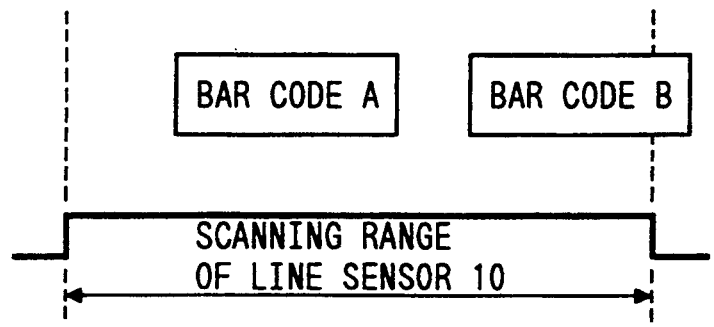
FIG. 12 is a diagram illustrating a reading operation of a bar code by the optical reading apparatus shown in FIGS. 10 and 11.
Figure 13:
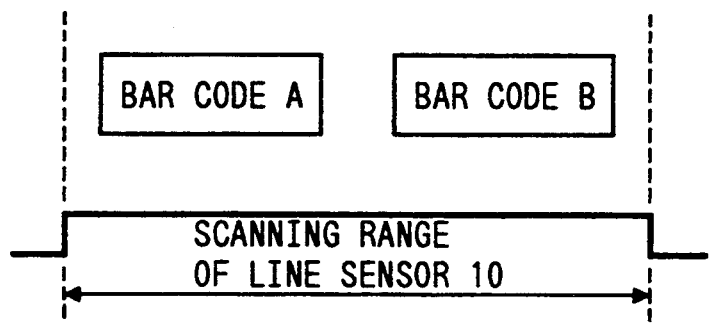
FIG. 13 is a similar view but illustrating another reading operation of a bar code by the optical reading apparatus shown in FIGS. 10 and 11.

Referring now to FIG. 7, there is shown part of an optical reading apparatus according to a third preferred embodiment of the present invention. Also the present optical reading apparatus has a generally common construction to the conventional optical reading apparatus described hereinabove with reference to FIGS. 10 and 11, and overlapping description of such common construction is omitted to avoid redundancy. It is to be noted that the present optical reading apparatus has the same construction at a portion thereof corresponding to that portion of the conventional optical reading apparatus which is shown is shown in FIG. 10 as that portion, and accordingly, the portion of the present optical reading apparatus is omitted from the drawings, but only the remaining portion of the present optical reading apparatus which corresponds to the portion of the conventional optical reading apparatus shown in FIG. 11 is shown in FIG. 7. The present optical reading apparatus is thus different from the conventional optical reading apparatus in that it includes a data coincidence number counter 31' in place of the data coincidence number counter 31 and additionally includes a stop code coincidence comparator 36.

The optical reading apparatus shown in FIG. 7 is designed for use with a bar code system which includes a plurality of different stop codes. Thus, the start/stop judging section 26 stores therein registered stop code patterns corresponding to the stop codes. Stop code data SSC outputted from the start/stop judging section 26 are supplied to the output data converting section 33 and also to the stop code coincidence comparator 34. The stop code coincidence comparator 36 compares m+1 (m is an integer equal to or higher than 1) stop code data SSC with each other to determine whether the m+1 stop code data SSC supplied successively thereto till then coincide all with each other. For example, if it is assumed now that n+m (n is an integer equal to or higher than 1) reading scanning operations for a bar code have been performed, the stop code coincidence comparator 36 compares stop code data SSC obtained by the (n+m)th reading scanning operation with stop code data SSC obtained by the (n+1)th to {n+(m−1)}th reading scanning operations in the past to check coincidence between them.

When all of the stop code data SSC coincide with each other, a coincidence pulse is outputted from the stop code coincidence comparator 36 and placed into the data coincidence number counter 31'. Then, when a coincidence pulse is developed from the character code coincidence comparator 28, the data coincidence number counter 31' is incremented by one.

That all of the (m+1) stop data SSC obtained by reading scanning operations of the bar code performed successively in this manner coincide with each other means that the stop code of the bar code has been read correctly. In case the stop code of the bar code has been read correctly and the character codes have been read correctly, when both of the stop code coincidence comparator 36 and the character code coincidence comparator 28 develop a coincidence pulse upon a same bar code reading scanning operation, the data coincidence number counter 31' is incremented by one. Then, when the count value of the data coincidence number counter 31' coincides with a preset coincidence number of the constant memory 30, the data coincidence number comparator 32 outputs a reading completion signal REND1, and in response to such reading completion signal REND1, the output data converting section 33 sends character data CD from the character converting section 27 and stop code data SSC from the start/stop judging section 26 to the host equipment.

When any one of the m+1 stop code data SSC is different from the remaining ones, the stop code coincidence comparator 36 outputs an error signal ERR4. In response to the error signal ERR4, the error processing circuit 29 outputs a character conversion reset signal CERT to initialize the data coincidence number counter 31' and so forth and immediately start a next reading operation of the bar code.

Thus, if there is an error in reading of the stop code of the bar code from such causes as described hereinabove, then while m+1 stop code data SSC are obtained by m+1 sequential bar code reading scanning operations, at least one of them is different from the remaining ones, which is detected with certainty by the stop code coincidence comparator 36. Accordingly, even if it is judged by the start/stop judging section 26 that a detected stop code pattern SCD coincides casually with one of the registered stop code patterns while there is an error in reading of the stop code and consequently stop code data SSC are obtained, the output data converting section 33 will send none of character data CD and stop code data SSC to the host equipment.

Further, when m+1 stop code data SSC do not coincide completely with each other, the stop code coincidence comparator 36 develops an error signal ERR4 to render the error processing circuit 29 operative to make the optical reading apparatus prepare for a next bar code reading scanning operation. In particular, if there is an error in reading of the stop code, then a next bar code reading scanning operation is performed unless the number of bar code reading operations do not reach a number of times defined by the data stored in the scanning number memory 15 (FIG. 10). Accordingly, reading of the bar code will not be ended with the stop code left read in error.

Figure 8:
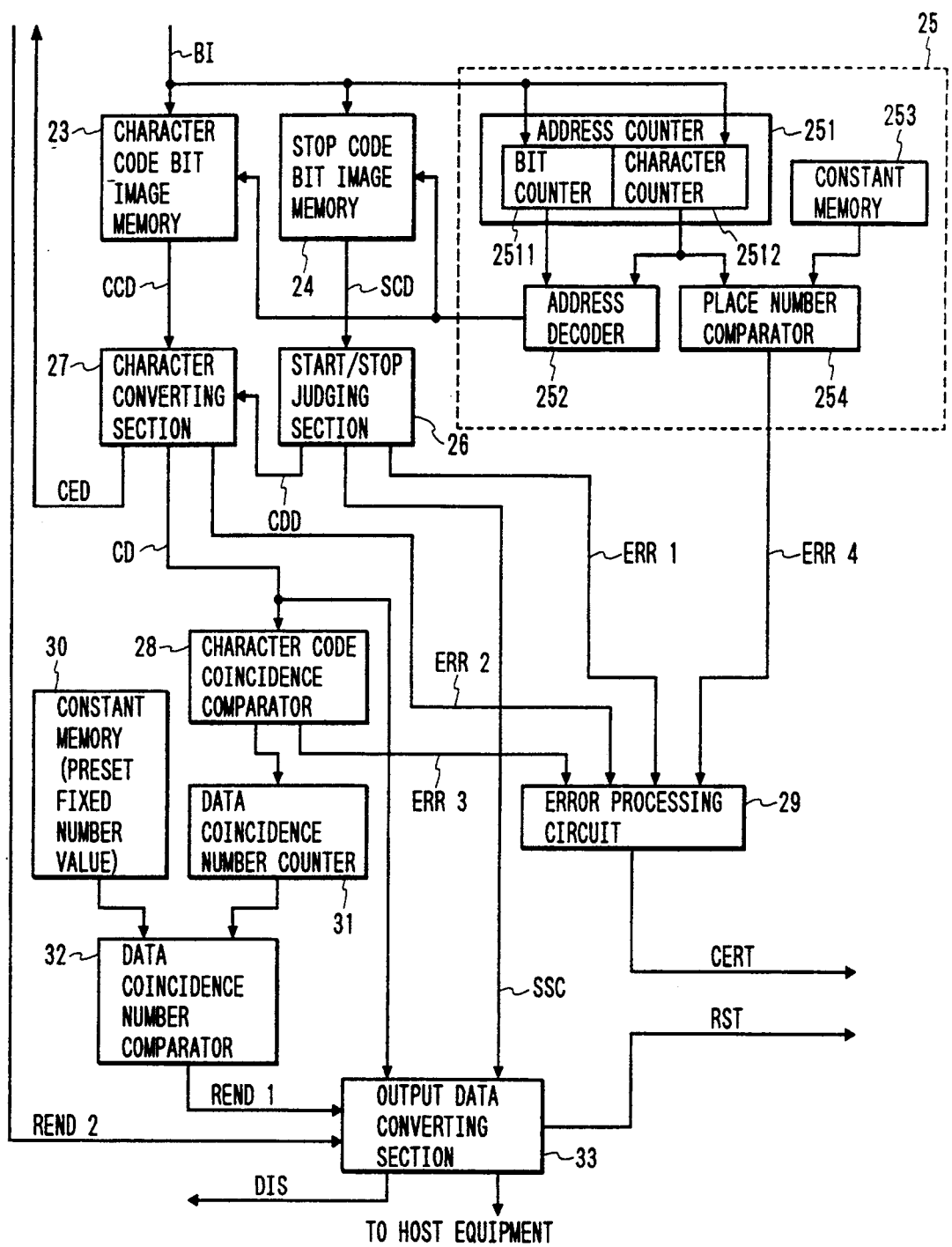
FIG. 8 is a similar view but showing a fourth preferred embodiment of the present invention.

Referring now to FIG. 8, there is shown an optical reading apparatus according to a fourth preferred embodiment of the present invention. Also the present optical reading apparatus has a generally common construction to the conventional optical reading apparatus described hereinabove with reference to FIGS. 10 and 11, and overlapping description of such common construction is omitted to avoid redundancy. It is to be noted that also the present optical reading apparatus has the same construction at a portion thereof corresponding to that portion of the conventional optical reading apparatus which is shown in FIG. 10 as that portion, and accordingly, the portion of the present optical reading apparatus in that the bit drawings, but only the remaining portion of the present optical reading apparatus which corresponds to the portion of the conventional optical reading apparatus shown in FIG. 11 is shown in FIG. 8. The present optical reading apparatus is thus different from the conventional optical reading apparatus in that the bit image memory controlling section 25 additionally includes a constant memory 253 and a place number comparator 254.

The constant memory 253 has stored therein a constant representative of a number places of a bar code specified by a bar code system employed in the optical reading apparatus.

When a bar code is read and bit images BI thereof are supplied to the bit image memory controlling section 25, the character counter 2512 counts a number of places of the bar code as described hereinabove. In this instance, after reading out from the count value memory 20 (FIG. 10) is completed, the place number comparator 254 operates to compare the count value of the character counter 2512 with the constant of the constant memory 253. When they coincide with each other, the place member comparator 254 does not develop an error signal ERR4, and consequently, a decoding operation such as character conversion described hereinabove with reference to FIG. 11 will be performed. However, when the count value of the character counter 2512 and the constant of the constant memory 253 do not coincide with each other, the place number comparator 254 generators an error signal ERR4 and sends it to the error processing circuit 29. Consequently, the error processing circuit 29 outputs a character conversion reset signal CERT to start a bar code reading operation again.

In this manner, with the present optical reading apparatus, when writing bit images BI into the stop code bit image memory 24 and the character code bit image memory 23 is completed, that is, before character converting processing is performed, a number of places of a bar code read is detected and it is judged whether or not the number of places is correct. Consequently, an error in reading of a bar code with a wrong number of places is detected in a short interval of time. Besides, in such instance, no character conversion is performed, and decoded data of the bar code obtained by such erroneous reading will not be transmitted to the host equipment.

It is to be noted that all constants of place numbers of bar codes specified by the bar code system may be stored in the constant memory 253, and in this instance, the optical reading apparatus can process bar codes of all of such place numbers. Thus, the place number comparator 254 successively compares a count value of the character counter 2512 with the coefficients of the constant memory 253 until coincidence is detected, and when the count value coincides with none of the coefficients, the place number comparator 254 outputs an error signal ERR4.

Figure 9:
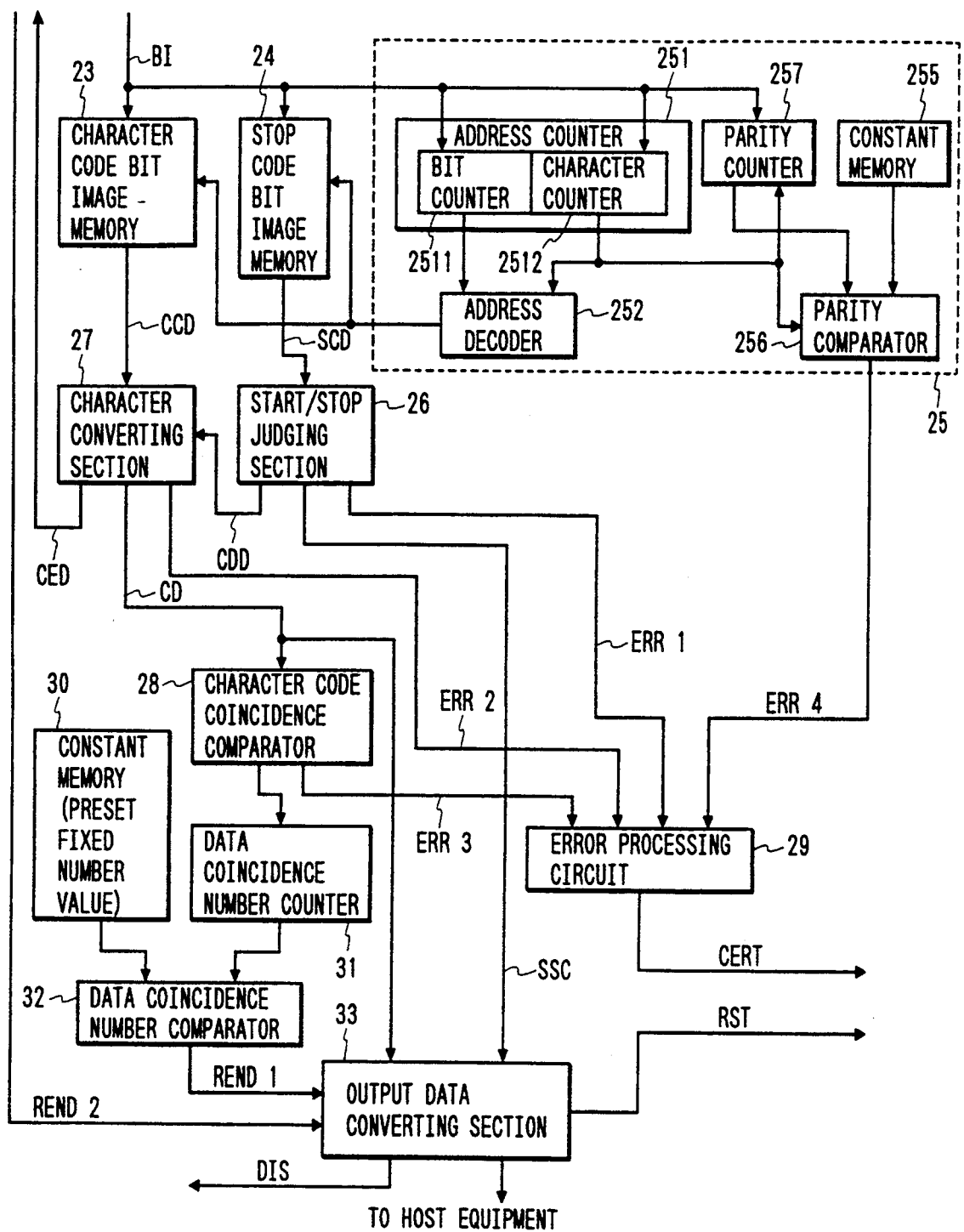
FIG. 9 is a similar view but showing a fifth preferred embodiment of the present invention.

Referring now to FIG. 9, there is shown an optical reading apparatus according to a fifth preferred embodiment of the present invention. The present optical reading apparatus is a modification to the optical reading apparatus described hereinabove with reference to FIG. 8 in that the bit image memory controlling section 25 thereof includes a constant memory 255 and a parity comparator 256 in place of the constant memory 253 and the place number comparator 254, respectively, and additionally includes a parity counter 257.

The present optical reading apparatus is constituted such that either thick bar or a thin bar of a character of a bar code is used as parity information. Thus, a constant representative of a number of thick bars or thin bars per one character specified by the bar code system employed is stored in the constant memory 255. For convenience of description, it is assumed here that a number of thick bars is used as parity information and the constant stored in the constant memory 255 is "2" in accordance with the 2-of-5 bar code system.

When a bar code is read and bit images BI thereof are supplied to the bit image memory controlling section 25, the character counter 2512 counts a number of places of the bar code as described hereinabove with reference to FIG. 8. The parity counter 257 operates, when the count value of the character counter 2512 is equal to or higher than 1, to count bit images BI corresponding to thick bars of the bar code. However, the parity counter 257 is reset at a predetermined timing a little later than a first timing at which the count value of the character counter 2512 changes but earlier than a second timing of a bit image BI which is supplied for the first time after the first timing. Consequently, the parity counter 257 counts a number of thick bars for each number of bars for one character code of the bar code. In order to achieve such operation, though not shown, the parity counter 257 includes, for example, a decoder for detecting that the count value of the character counter 2512 has changed and whether or not the count value is equal to or higher than 1, and a pulse generator for producing a reset pulse at such predetermined timing as described above from a detection output of the decoder.

The parity comparator 256 is enabled when the count value of the character counter 2512 is equal to or higher than 1 and compares a count value of the parity counter 257 and the constant of the constant memory 255 at a timing at which the count value of the character counter 2512 changes. Then, when the two values compared do not coincide with each other, the parity comparator 256 outputs an error signal ERR4. Consequently, it is determined whether or not a bar code is read such that bars of each character code include a specified number of thick bars, that is, whether or not the bar code is read without an error, and if there is an error in reading of the bar code, then the parity comparator 256 generates an error signal ERR4. In response to the error signal ERR4, the error processing circuit 29 generates a character conversion reset signal CERT to initialize the character code bit image memory 23, stop code bit image memory 24 and so forth of the optical reading apparatus to resume reading of the bar code.

Thus, if the quality of the bar code is so low that a thick bar is read as a thin bar or a stain or a damage is present between bars of the bar code and read as a bar, then since, in the former case, the number of thick bars in a character code including the bar decreases but, in the latter case, bars of character codes are displaced by the additional false bar so that the number of thick bars of some one of the character codes is different from a specified number, such situation will be detected by the parity comparator 256.

Such erroneous reading of a bar code is detected when bit images BI are written into the character bit image memory 23. Accordingly, if there is an error in reading of a bar code, then at a point of time when the error is detected, writing of bit images BI into the character code bit image memory 23 is suspended, and character converting processing will not be performed, but a next reading operation of the bar code will be performed.

It is to be noted that, when the bar code scanner is not touched at an appropriate position on a print medium, part of a bar code may protrude from the scanning range of the line sensor and may not be read by the line sensor. In such an instance, part of the last character code of the bar code is not read by the line sensor, and consequently, the number of bars of the character code will be different from a specified one. In this instance, however, the count value memory controlling section 21 (FIG. 10) operates in error, and correct reading from the count value memory 20 is not performed. In particular, while the count value memory controlling section 21 is constituted such that it starts, in response to the start code at the top of the bar code 6, writing into the count value memory 20 in accordance with a count value from the timer counter 19 and then starts reading out from the count value memory 20 in response to a scanning end signal SED from the scanning counter 4, if part of the bar code 6 is not read as described above, then the count value memory controlling section 21 starts reading out from the count value memory 20 directly in response to the scanning end signal SED without returning to its initial condition because the stop code at the last end of the bar code 6 is detected. Consequently, a correct count value will not be read out from the count value memory 20, but bit images BI of an array of bars quite different from an actual array of bars of the bar code 6 will be outputted from the bit image converting section 22 (FIG. 10). This will be detected by the parity comparator 256 of FIG. 9, and an error signal ERR4 will be generated from the parity comparator 256.

It is to be noted that the parity counter 257 may alternatively count bit images BI corresponding to thin bars.

Having now fully described the invention, it will be apparent to one of ordinary skill in the art that many changes and modifications can be made thereto without departing from the spirit and scope of the invention as set forth herein.

What is claimed is:

1. An optical reading apparatus comprising:

means for producing a first clock signal, a scanning counter for counting pulses of the first clock signal and for generating
 a scanning count value equal to the number of counted pulses, a line sensor having a scanning range of a size corresponding to a plurality of bar codes for converting optical data representing the plurality of bar codes printed on a print medium and for generating an output signal representing the bar codes, means for receiving and binary digitizing the output signal of said line sensor and for generating a binary signal, an edge detector for detecting edges of the binary signal and for generating an edge signal, means for generating a second clock signal, a timer counter for counting pulses of the second clock signal for each edge signal and for generating a plurality of first count values corresponding to widths of bars of the bar codes, a count value memory for receiving and storing the first count values, means for receiving and decoding the first count values stored in said count value memory and for generating character data of the bar codes, a memory for storing a second count value equal to a portion of the predetermined number of pulses of the first clock signal, means for comparing the second count value with the scanning count value and for generating a control signal when the scanning count value is greater than the second count value, and means responsive to the control signal for allowing only the first count values associated with a bar code which has a starting and detected prior to transmission of the control signal to be written into said count value memory, thereby allowing only one of a plurality of bar codes to be read and decoded by said optical reading apparatus.

* * * * *